US011508016B1

(12) United States Patent
Morrisette et al.

(10) Patent No.: US 11,508,016 B1
(45) Date of Patent: Nov. 22, 2022

(54) DETERMINING A RESOURCE FOR A PLACE BASED ON THREE-DIMENSIONAL COORDINATES THAT DEFINE THE PLACE

(71) Applicant: Avalara, Inc., Seattle, WA (US)

(72) Inventors: Charles M. Morrisette, Everett, WA (US); Rohit Ghule, Maharashatra (IN); Mark Janzen, Seattle, WA (US); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 220 days.

(21) Appl. No.: 16/891,033

(22) Filed: Jun. 2, 2020

Related U.S. Application Data

(63) Continuation of application No. 62/970,072, filed on Feb. 4, 2020.

(51) Int. Cl.
*G06Q 40/00* (2012.01)
*H04W 4/029* (2018.01)
*G06F 16/29* (2019.01)
*G06F 16/2457* (2019.01)

(52) U.S. Cl.
CPC ....... *G06Q 40/10* (2013.01); *G06F 16/24575* (2019.01); *G06F 16/29* (2019.01); *H04W 4/029* (2018.02)

(58) Field of Classification Search
CPC ... G06Q 30/0643; G06Q 40/10; H04W 4/029; G06F 16/29; G06F 16/24575
USPC .................. 378/205; 703/1, 2; 705/27.2, 31; 715/848
See application file for complete search history.

(56) References Cited

U.S. PATENT DOCUMENTS

| 6,359,959 B1* | 3/2002 | Butler ..................... A61B 6/12 378/205 |
| 7,783,536 B2 | 8/2010 | William et al. |
| 7,860,693 B2* | 12/2010 | Chen ..................... E21B 49/003 703/2 |
| 7,933,803 B1 | 4/2011 | Nadler et al. |
| 7,974,786 B2* | 7/2011 | Han ....................... G16B 45/00 703/2 |

(Continued)

FOREIGN PATENT DOCUMENTS

| AU | 2009321691 | * | 6/2011 |
| CA | 102006032990 | * | 1/2008 |

(Continued)

*Primary Examiner* — Andrew Joseph Rudy
(74) *Attorney, Agent, or Firm* — Nicholson, De Vos, Webster & Elliott, LLP

(57) ABSTRACT

Receiving a dataset and parsing from the dataset an XP coordinate value on an x-axis, a YP coordinate value on a y-axis, and a ZP coordinate value on a z-axis all within a domain having 3-dimensional features. The x-axis and y-axis are perpendicular and define a horizontal earthbound main surface. The ZP coordinate value is on the z-axis perpendicular to the horizontal earthbound main surface. The XP, YP and ZP define a place associated with a 3-dimensional feature. Stored resource rules for places in the domain are accessed that indicate a first resource if the ZP has a first value, and a second resource if the ZP has a second value. One of the resource rules that applies to the place is identified based on XP, YP and ZP. A resource for the dataset is determined by applying the identified rule. The resource is caused to be transmitted.

14 Claims, 12 Drawing Sheets

(56) References Cited

U.S. PATENT DOCUMENTS

| | | | |
|---|---|---|---|
| 8,566,749 B2 * | 10/2013 | Kashik | G06F 3/04815 |
| | | | 715/848 |
| 8,620,578 B1 | 12/2013 | Brown et al. | |
| 8,725,407 B2 | 5/2014 | Hurley et al. | |
| 9,286,810 B2 * | 3/2016 | Eade | G06K 9/6201 |
| 9,723,453 B2 * | 8/2017 | Smith | G01C 21/00 |
| 9,760,915 B2 | 9/2017 | Pavlou et al. | |
| 10,445,818 B1 | 10/2019 | Chowdhary | |
| 10,702,216 B2 * | 7/2020 | Sareen | G06T 19/00 |
| 10,769,611 B2 | 9/2020 | McNeel | |
| 2007/0136158 A1 | 6/2007 | Rawlings et al. | |
| 2007/0136159 A1 | 6/2007 | Rawlings et al. | |
| 2014/0039851 A1 * | 2/2014 | Heinz | G16C 10/00 |
| | | | 703/2 |

FOREIGN PATENT DOCUMENTS

| | | | |
|---|---|---|---|
| CA | 2418111 | * | 4/2011 |
| JP | 3713381 B2 | * | 11/2005 |

* cited by examiner

FIGURE 2 — METHODS

| X | Y | Z (ft., above or below main surface) | RP |
|---|---|---|---|
| ... | ... | ... | ... |
| ... | ... | $Z < -50$ | RP51 |
| ... | ... | $-50 =< Z < -20$ | RP52 |
| ... | ... | $-20 =< Z < 0$ | RP53 |
| ... | ... | $0$ | RP54 |
| ... | ... | $0 < Z =< 30$ | RP55 |
| ... | ... | $30 < Z =< 100$ | RP56 |
| ... | ... | $100 < Z =< 300$ | RP57 |
| ... | ... | $300 < Z$ | RP58 |
| ... | ... | ... | ... |

FIGURE 5

| X | Y | Z (# of surfaces above or below main surface) | RP |
|---|---|---|---|
| ... | ... | ... | ... |
| ... | ... | $Z < -5$ | RP61 |
| ... | ... | $-5 =< Z < -2$ | RP62 |
| ... | ... | $-2 =< Z < 0$ | RP63 |
| ... | ... | 0 | RP64 |
| ... | ... | $0 < Z =< 3$ | RP65 |
| ... | ... | $3 < Z =< 10$ | RP66 |
| ... | ... | $10 < Z =< 30$ | RP67 |
| ... | ... | $30 < Z$ | RP68 |

FIGURE 6

CONVERSION TABLE $$N > 0 \rightarrow H\ (ft.) = N \times 13.5 \quad \text{Equation (7B-1)}$$

$$N < 0 \rightarrow H\ (ft.) = N \times 25 \quad \text{Equation (7B-2)}$$

FIGURE 7B  CONVERSION EQUATIONS

FIGURE 11 *USE CASE*

DETERMINING A RESOURCE FOR A PLACE BASED ON THREE-DIMENSIONAL COORDINATES THAT DEFINE THE PLACE

CROSS REFERENCE TO RELATED PATENT APPLICATIONS

This patent application claims priority from U.S. provisional patent application Ser. No. 62/970,072, filed on Feb. 4, 2020.

BRIEF SUMMARY

The present description gives instances of computer systems, storage media that may store programs, and methods.

In embodiments, a computer system may receive a dataset. The computer system may then parse from the dataset an XP coordinate value that is defined along an x-axis, a YP coordinate value that is defined along a y-axis, and a ZP coordinate value that is defined along a z-axis. The x-axis, the y-axis, and the z-axis may be defined within a domain that encompasses at least two 3-dimensional features. The x-axis and the y-axis may be perpendicular to each other and may define a horizontal earthbound main surface within the domain. The ZP coordinate value may be defined along the z-axis that is perpendicular to the horizontal earthbound main surface. The parsed XP, YP and ZP coordinate values may thus define a certain place within the domain, a specific 3-dimensional feature of the at least two 3-dimensional features being associated with the certain place. The computer system may then access stored resource rules for places in the domain. The stored resource rules may indicate a first resource if the ZP coordinate value has a first number value, and a second resource different from the first resource if the ZP coordinate value has a second number value different from the first number value. The computer system may then identify, based on the parsed XP, YP and ZP coordinate values, a certain one of the accessed resource rules that applies to the place. The computer system may then determine, by applying the identified certain resource rule, a resource for the dataset. The computer system may then cause the determined resource to be transmitted in response to the received dataset.

An advantage can be that in embodiments, a resource may be determined based in part on a ZP coordinate value and/or a place along the Z-axis in situations where the resource depends not only on a location on the horizontal earthbound main surface defined by XP and YP coordinates or X- and Y-axis, but also on non-zero values of the ZP coordinate value and/or place along the Z-axis. A use case can be where it is desired to take into account heights above or below the horizontal earthbound main surface, ordinal numbers of horizontal surfaces above or below the horizontal earthbound main surface, other three-dimensional (3-dimensional) features, or other non-zero ZP coordinate values when determining the resource.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 5 is a table storing resource rules that apply within a domain (e.g., as defined by XP, YP, and ZP coordinate values), and in which the ZP coordinate value is applied and gives an answer according to a vertical reference system defined in terms of distance above or below a main surface.

FIG. 6 is a table storing resource rules that apply within a domain (e.g., as defined by XP, YP, and ZP coordinate values), and in which the ZP coordinate value is applied and gives an answer according to a vertical reference system defined in terms of ordinal numbers of horizontal surfaces above or below a main surface.

FIG. 7B illustrates conversion equations to convert a ZP coordinate value to a converted ZPC coordinate value as part of identifying a stored resource rule that applies to a place or ZP coordinate value according to embodiments.

DETAILED DESCRIPTION

As has been mentioned, the present description is about computer systems, storage media that may store programs, and methods. Embodiments are now described in more detail.

Figure 1:
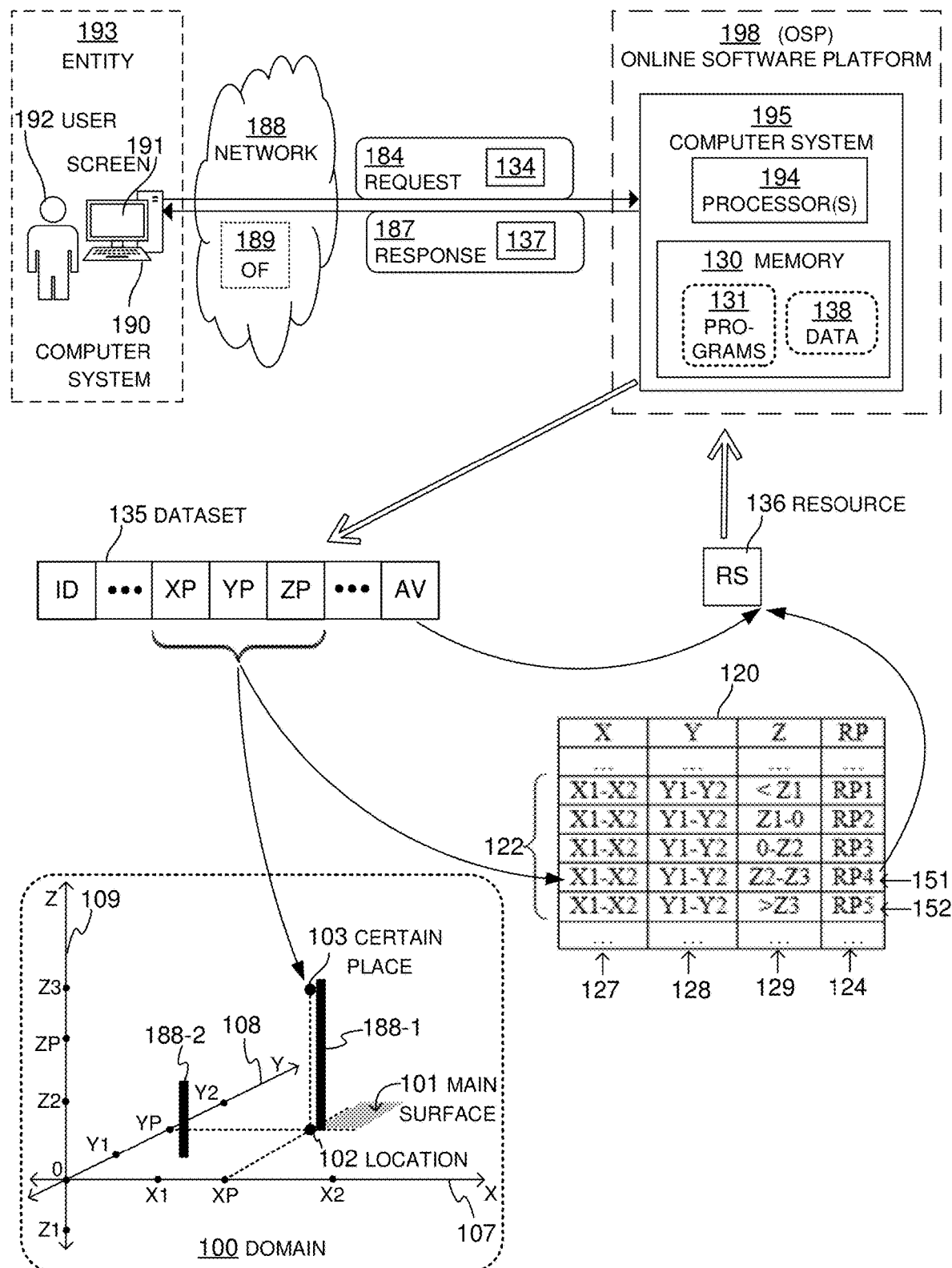
FIG. 1 presents a composite diagram, with an upper portion showing a sample environment in which a computer system communicates with another sample computer system via a communication network, such as the Internet, to have the sample computer system determine a resource in accordance with embodiments; and a lower portion conceptually showing a sample approach that the sample computer system may use to determine the resource according to embodiments.

FIG. 1 presents a composite diagram, with an upper portion showing one sample environment in which a computer system 190 communicates with another sample computer system 195 via a communication network 188, such as the Internet, to have the sample computer system 195 determine a resource (RS) 136 in accordance with embodiments; and a lower portion conceptually showing a sample approach that the sample computer system 195 may use to determine the resource (RS) 136 according to embodiments. In these diagrams, arrows show salient conceptual relations between elements shown in the diagrams. In other embodiments, the determination of the resource (RS) 136 may be used in other environments besides that shown in the upper portion.

Referring first to the upper portion, a user 192 may be standalone, or optionally part of an entity 193. The user 192 may use the computer system 190. The computer system 190 may have a screen 191 and optionally additional sample implementation details described later in this document (e.g., those shown in FIG. 10). The computer system 190 may access the sample computer system 195 via the communications network 188, such as the Internet. Such accessing can be for example, by the computer system 190 transmitting a request 184 including a payload 134 in a way that the request 184 and the payload 134 are received by the sample computer system 195. In some embodiments, the request 184 may include a request that the sample computer system 195 determine the resource (RS) 136. In some embodiments, the payload 134 may include at least some, or optionally all, of a dataset (e.g., dataset 135) that is useful to determine the resource (RS) 136.

The sample computer system 195 has one or more processors 194 and a memory 130. The memory 130 may optionally store programs 131 and data 138. The processor(s) 194 may perform one or more of the programs 131, potentially utilizing some of the data 138, to perform operations and methods described elsewhere herein (e.g., to determine the resource (RS) 136). The computer system 195 may optionally have additional sample implementation details described later in this document (see e.g., those shown in FIG. 10). The computer system 195 may optionally be implemented as part of an online software platform (OSP) 198. Additionally, downloading may be permitted from one of these two computer systems to another, and so on. Moreover, in some embodiments, data from the computer system 190 and/or from the computer system 195 may optionally be stored in an online facility (OF) 189 (e.g., which may be located someplace in the network 188). In such embodiments, requests and responses may be exchanged with OF 189, downloading may involve OF 189, and so on.

The sample computer system 195 may receive the request 184 and the payload 134. In some embodiments, at least some or optionally all the dataset (e.g., dataset 135) useful to determine the resource (RS) 136 may be received from the computer system 190 or entity 193 via the network 188 (e.g., as part of the payload 134). As other options, the computer system 195 may optionally receive some of the dataset by loading some of the data 138 from the memory, by downloading data from the online facility (OF) 189, or in other ways. The sample computer system 195 may parse the dataset (e.g., parse the payload 134) to determine values that allow it to determine the resource (RS) 136. In some embodiments, as will be described further below in this document, one of these values may be a ZP coordinate value defining a position along a z-axis or vertical axis. The sample computer system 195 may determine the resource (RS) 136 based on these values, as will be described further below in this document.

In some embodiments, the sample computer system 195 may then cause the resource RS 136 to be communicated or transmitted to another device via the network 188. For example, in response to receiving the request 184, the computer system 195 may transmit a response 187 in a way that the response 187 is caused to be received by the computer system 190, or to OF 189, or to both. In some of these embodiments, the resource (RS) 136 may be included in a payload 137 of the response 187. In some embodiments, the resource (RS) 136 may optionally be communicated along with at least some of the dataset (e.g., one or more values of the dataset 135) to help the recipient correlate the response 187 to the request 184 and/or the resource (RS) 136 as the response to the dataset (e.g., dataset 135). For example, the received dataset (e.g. dataset 135) may optionally be augmented with the computed resource (RS) 136, and then the dataset augmented with the determined resource (RS) 136 may be caused to be transmitted to the computer system 190, or to OF 189, or to both, via the network 188.

Figure 2:
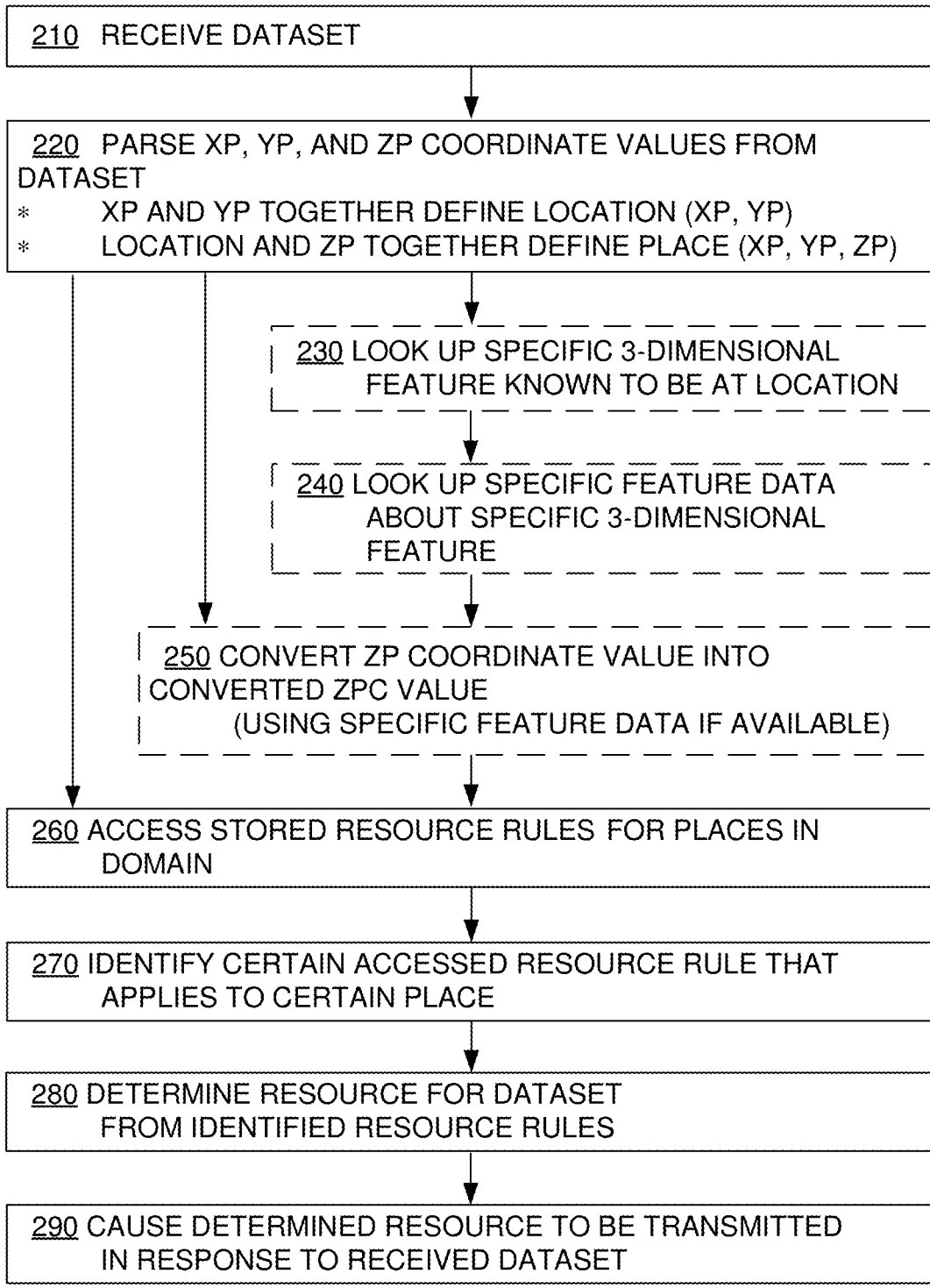
FIG. 2 is a flowchart for illustrating sample methods according to embodiments.

Further details of the lower portion of FIG. 1, which conceptually show a sample approach that the computer system 195 may use to determine the resource (RS) 136 according to embodiments, will now be further described in conjunction with FIG. 2. FIG. 2 is a flowchart illustrating a sample method 200 according to embodiments. The method 200 may be performed by a computer system, such as the sample computer system 195 of FIG. 1, the computer system 1090 or 1095 of FIG. 10, or another suitable computer system.

According to a first operation 210, a dataset may be received by a computer system. For example, the computer system may be the sample computer system 195 of FIG. 1 receiving the sample dataset 135. The dataset 135 may have several fields to provide several respective parameter values. For example, the sample dataset 135 has an identity field (ID) to provide an identity value associated with the dataset 135, or with an identity of the user 192 or the entity 193, and so on. The dataset 135 also has several fields to provide several respective coordinate values. The sample dataset 135 is based on a rectangular coordinate system and has an XP coordinate value field (XP) to provide an XP coordinate value, a YP coordinate value field (YP) to provide a YP coordinate value, and a ZP coordinate value field (ZP) to provide a ZP coordinate value. In other embodiments, other coordinate systems may optionally be used, such as a spherical coordinate system, and the dataset 135 may instead have fields to provide the coordinate values for these alternate coordinate systems. In some embodiments, the dataset 135 may optionally have an attribute value field (AV) to provide an attribute value for the dataset 135. As shown by the ellipses, the dataset 135 may optionally include one or more other fields (not shown) to provide additional information (e.g., about the user 192, about the entity 193, that is useful to determine the resource 136, and so on).

According to a second operation 220 of method 200, coordinate values (e.g., XP, YP, and ZP coordinate values in the case of a rectangular coordinate system) may be parsed from the dataset by the computer system. For example, the computer system may be the sample computer system 195 of FIG. 1, parsing an XP coordinate value, a YP coordinate value, and a ZP coordinate value from the dataset 135 (e.g., with the one or more processors 194). Parsing the coordinate values from the dataset 135 broadly represents identifying the coordinate values in the dataset 135 by examining, inspecting, analyzing, or otherwise parsing the dataset 135.

As shown in lower portion of FIG. 1, the XP coordinate value may be defined along an X-axis 107, the YP coordinate value may be defined along a Y-axis 108, and the ZP coordinate value may be defined along a Z-axis 109. The X-axis, the Y-axis, and the Z-axis may be defined within a domain 100 that encompasses at least two 3-dimensional features 188-1, 188-2, and in some cases optionally many more. The 3-dimensional features 188-1, 188-2 can be actual physical structures made from at least some solid materials, and of course having non-zero mass, meaning having a mass that is larger than zero. The X-axis and the Y-axis may be perpendicular to one other, and may define a horizontal earthbound main surface 101 within the domain 100. The XP coordinate value and the YP coordinate value together define a certain location (XP, YP) 102 on the horizontal main surface 101. For convenience, the certain location 102 is designated by a small circle or dot. In some embodiments, the location may be a single point, whereas in other embodiments the location may be a place, and being a place may have a non-zero area on the main surface 101.

The ZP coordinate value may be defined along a Z-axis 109 that is perpendicular to, and that extends in a vertical direction above and below, the horizontal main surface 101. The vertical direction is generally aligned with the direction of earth's gravity, whereas the horizontal main surface is generally perpendicular to the direction of gravity. In some embodiments, the horizontal earthbound main surface may represent a portion of the surface of the earth, or a surface above or below the surface of the earth. In such cases, the direction of gravity is as defined at that location 102. For simplicity, the horizontal earthbound main surface is often described as if it were planar, although in reality in such embodiments it may be either truly planar, slightly curved, or even a section of the spherical earth.

Different ZP coordinate values along the Z-axis 109 therefore represent different vertical distances above or below the horizontal main surface 101, which can be the earth's surface at the location 102. For example, considered along axis 109, Z1 is below the horizontal main surface 101, Z2 is above the horizontal main surface 101, ZP is further above the horizontal main surface 101 than Z2, and Z3 is even further above the horizontal main surface 101 than ZP. As shown by an arrow, collectively, the parsed XP, YP and ZP coordinate values may thus define a certain place (XP, YP, ZP) 103 in 3-dimensions within the domain 100, a specific 3-dimensional feature 188-1 of the at least two 3-dimensional features 188-1, 188-2 containing, adjoining, or otherwise being associated with the certain place 103. The certain place 103 is vertically above or below the certain location 102 for non-zero values of the ZP coordinate value. In the illustrated example, the certain place 103 is vertically above the location 102, although in other examples it could instead be below the location 102. The "Ps" in the XP, YP, and ZP coordinate values are used to designate that the coordinate values define the certain place 103.

In some embodiments, the second operation 220 may also optionally include parsing one or more other values from the dataset by the computer system. For example, the sample computer system 195 of FIG. 1, may optionally parse the attribute value from the attribute value field (AV) of the dataset 135. In such embodiments, the attribute value may be related to the certain place 103, and the computer system 195 may determine the resource (RS) 136 by computing it also from the attribute value as well as the coordinate values. For example, an attribute can be a base value, and the resource can be a specific multiple of the base value that is supplied by multiplying the base value as mandated by a resource rule that supplied the resource. Further details on the use of the attribute value to compute the resource (RS) 136 are given further below in this document.

According to another operation 260 of method 200, stored resource rules may be accessed, looked-up, or otherwise identified by the computer system. The resource rules may be accessed from where they are stored, which could be from data 138, or other locations in the web. The resource rules may be organized as tables or other data structures for effective use by the computer system. The resource rules may be for places in the domain. The resource rules may apply for determining the resource with respect to place (e.g., the certain place defined by the coordinate values). By way of example, such a resource rule may include a) a condition of when the rule applies that is based on the ZP coordinate value, and b) a consequent, i.e. a description of what is indicated or what is to happen when the corresponding condition is met (e.g., how the resource (RS) 136 is to be determined if the condition is met, and potentially data that may be used to perform what is to happen). The stored resource rules may indicate a first resource (e.g., a first value for the resource (RS) 136 if the ZP coordinate value has a first number value and a second resource different from the first resource (e.g., a second value different than the first value for the resource (RS) 136 if the ZP coordinate value has a second number value different from the first number value. For example, and referring to FIG. 1, a table or other data structure 120 may be stored in the memory 130, or in another memory that is accessed. The table 120 has an X-column 127, a Y-column 128, a Z-column 129, and an RP column 124. The table 120 implements resource rules for the domain 100 in an if-then implementation. In this implementation, each row shows one rule; the "if" statement is true when the coordinates of the certain place 103 are matched, and the "then" statement defines the resource RPn, (n=1, 2, . . . , 5) if the "if" statement is true for that rule.

According to another operation 270 of method 200, a certain one of a set of stored resource rules that applies to the certain place may be identified based on the parsed coordinate values (e.g., the XP, YP, and ZP coordinate values) by the computer system. To continue with the example of FIG. 1, in all of table 120, a set 122 of these resource rules have the exact same X and Y values with each other. This is because apply for the location 102, namely for values of XP being within X1 and X2, and for values of YP being within Y1 and Y2. Rules for additional locations are not shown explicitly, but are indicated by ellipses. It will be observed that the resource rules 122 indicate a first resource RP4 151 if the ZP coordinate value has a first number value between Z2 and Z3, and a second resource RP5 152 different from the first resource RP4 151 if the ZP coordinate value has a second number value larger than Z3, which different from the first number value between Z2 and Z3.

As such, the computer system may be the sample computer system 195 of FIG. 1, identifying a certain resource RP4 151, that applies for determining the resource (RS) 136 with respect to the certain place 103, based on the parsed XP, YP, and ZP coordinate values (e.g., through processing with the one or more processors 194). The resource rules 122 may apply for determining the final resource (RS) 136 with respect to place (e.g., the certain place 103 defined by the XP, YP, and ZP coordinate values). For example, resource RS 136 may be determined by replicating resource value RP4 151, or by using resource value RP4 151 with the attribute value of the attribute value field AV.

Referring again to FIG. 2, according to another operation 280, the computer system may determine the resource for the dataset by applying the certain resource rule identified by the operation 260. For example, the computer system may be the sample computer system 195 of FIG. 1 determining the resource (RS) 136 for the dataset 135 by applying the fourth resource rule (RP4) 151 (which was identified by the XP, YP, and ZP coordinate values), for example by the one or more processors 194 applying the fourth resource rule. In some embodiments, determining the resource (RS) 136 may include merely looking up or otherwise identifying a predetermined value for the resource (RS) 136 for that particular resource rule. In other embodiments, determining the resource (RS) 136 may include calculating the value for the resource (RS) 136 for that particular resource rule (e.g., based on an equation and/or data for that particular resource rule). In any event, the resource rule may specify or modulate how the resource (RS) 136 is to be determined and is based on at least the ZP coordinate value.

According to one more operation 290, the computer system may cause the determined resource to be transmitted in response to the received data set. In some embodiments, the determined resource may optionally be transmitted along with at least some of the received dataset, or optionally the entire received dataset. For example, the computer system may be the sample computer system 195 of FIG. 1 which may cause the resource RS 136 to be transmitted to another device via the network 188. For example, the computer system 195 may transmit the response 187 in a way that the response 187 is caused to be received by the computer system 190, or to OF 189, or to both. In some of these embodiments, the resource (RS) 136 may be included in the payload 137 of the response 187. In some embodiments, the resource (RS) 136 may optionally be transmitted or communicated along with at least some of the received dataset 135 (e.g., an identity value), or optionally the entire received dataset. One reason to do this is to include information with the resource (RS) 136 to help a recipient of the resource (RS) 136 correlate the received resource (RS) 136 with the request 184, the dataset 135, or the coordinate values (e.g., XP, YP, ZP) used to determine the resource (RS) 136.

Referring again to FIG. 2, according to another optional operation 230, the computer system (e.g., computer system 195 of FIG. 1) may optionally look up or otherwise identify a specific 3-dimensional feature (e.g., feature 188-1) known to be at a location defined by the parsed XP and YP coordinate values. According to another optional operation 240, the computer system (e.g., computer system 195 of FIG. 1) may optionally look up or otherwise identify specific feature data about the identified specific 3-dimensional feature (e.g., feature 188-1). According to another optional operation 250, the computer system (e.g., computer system 195 of FIG. 1) may optionally convert the parsed ZP coordinate value into a converted ZPC coordinate value. In some embodiments, the operation 250 may be performed after the performance of the operations 230 and 240. In such cases, the conversion of the ZP coordinate value to the converted ZPC coordinate value may be performed based on or in view of the specific feature data about the specific 3-dimensional feature that was identified during the operation 240. In other embodiments, the operation 250 may be performed after the operation 220 without performing the optional operations 230 and 240.

Figure 3:
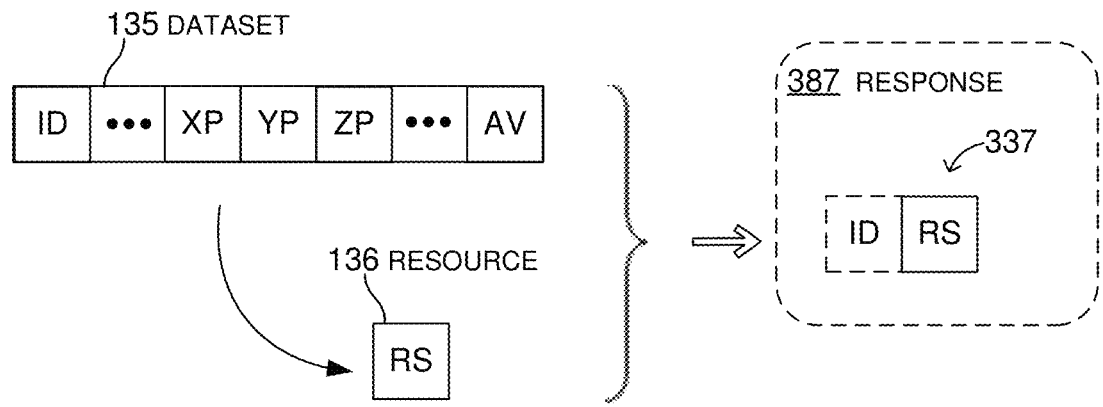
FIG. 3 is a diagram of a sample payload of a response according to an embodiment.

FIG. 3 is a diagram of a sample payload 337 of a response 387 according to an embodiment. In some embodiments, the response 387 and payload 337 may be used as the response 187 and payload 137 of FIG. 1, although the response 387 and payload 337 may also be used in other environments. As previously described, a resource (RS) 136 may be determined. Then, the determined resource (RS) 136 may be included by the computer system as part of the payload 337 of the response 387. In some embodiments, one or more values from the received dataset 135, such as the identity value (ID) associated with the dataset 135, may also optionally be appended to the resource (RS) 136 or otherwise included as part of the payload 337. Providing the identity value (ID) along with the resource (RS) 136 may help a recipient of the resource (RS) 136 correlate the received resource (RS) 136 with a corresponding request (e.g., request 184), the dataset 135, and so on.

Figure 4:
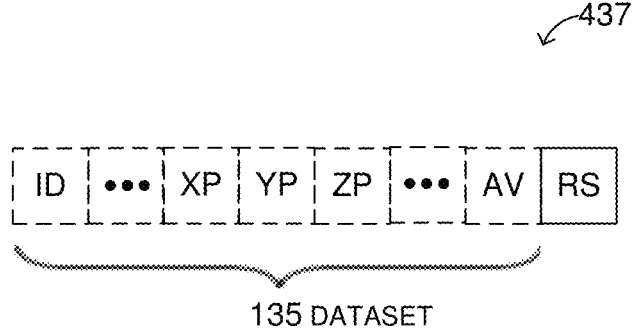
FIG. 4 is a diagram of another sample payload of a response according to another embodiment.

FIG. 4 is a diagram of another sample payload 437 suitable for a response according to another embodiment. The sample payload 437 includes a determined resource (RS) 136 for example stored in a resource field (RS). The sample payload 437 also optionally includes any one or more (e.g., any combination) or optionally all values from a received dataset 135. In the illustrated example, the sample payload 437 includes all values of the received dataset 135. For example, the entire received dataset 135 may optionally be augmented by the computer system with the determined resource (RS) 136. In one such case, the resource 136 may be appended to the received dataset 135 by the computer system. In other embodiments, only some but not all of the values from the received dataset 135 may optionally be included in the payload 437 by the computer system. Then, the resource (RS) 136 may be caused to be transmitted by the computer system causing the payload 437 (e.g., the dataset 135 augmented with the resource (RS) 136) to be transmitted via the network 188 to a recipient.

FIG. 5 is a table or other data structure 520 storing resource rules for a domain, such as domain 100, which are organized similarly with the resource rules of table 120 of FIG. 1. Indeed, the table 520 has X-, Y-, Z-, and RP columns 527, 528, 529, and 524. The specific values or ranges for the X and Y columns are not shown because they mare not necessary to understand the vertical reference system and its application. It just needs to be understood that there may be some values or ranges in these columns. As shown by ellipses, the set of resource rules 520 represent only a portion of all the resource rules stored in the table.

A set 522 of the resource rules of table 520 are for a single certain location (e.g., location 102 or pair of XP and YP coordinate values), where the X-coordinate and the Y-coordinate are the same, and only the Z coordinate varies. In this example, the ZP coordinate value, seen in a square, is applied for lookup to the Z column 529, and gives an answer according to a vertical reference system defined in terms of distance above or below a main surface (e.g., horizontal earthbound main surface 101 in FIG. 1). The vertical reference system is considered generally parallel to the Z-axis on which the ZP coordinate value is defined. As such, resource values RP5$n$ (n=1, . . . , 8) can be looked up from the ZP coordinate value.

In such embodiments, the ZP coordinate value at the place indicates the height or distance above or below the main horizontal surface. In this specific example, the distances are expressed in feet although meters, inches, centimeters, or other dimensions may be used instead. The main horizontal surface may be an earthbound surface at position 0 ft. Negative distances are below the horizontal earthbound main surface, whereas positive distances are above the horizontal earthbound main surface. Sample values in feet can be read from FIG. 5.

FIG. 6 is a table or other data structure 620 storing resource rules for a domain, such as domain 100, which are organized similarly with the resource rules of table 120 of FIG. 1. Indeed, the table 620 has X-, Y-, Z-, and RP columns 627, 628, 629, and 624. The specific values or ranges for the X and Y columns are not shown because they mare not necessary to understand the vertical reference system and its application. It just needs to be understood that there may be some values or ranges in these columns. As shown by ellipses, the set of resource rules 620 represent only a portion of all the resource rules stored in the table.

A set 622 of the resource rules of table 620 are for a single certain location (e.g., location 102 or pair of XP and YP coordinate values), where the X-coordinate and the Y-coordinate are the same, and only the Z coordinate varies. In this example, the ZP coordinate value, seen in a square, is applied for lookup to the Z column 629, and gives an answer according to a vertical reference system defined in terms of ordinal numbers of horizontal surfaces above or below a main surface (e.g., horizontal earthbound main surface 101 in FIG. 1). The vertical reference system is considered generally parallel to the Z-axis on which the ZP coordinate value is defined. As such, resource values RP6$n$ ($n$=1, ..., 8) can be looked up from the ZP coordinate value.

In such embodiments, the ZP coordinate value indicates an Nth horizontal surface above or below the main surface. The main surface is located at ordinal number zero (0). Negative ordinal numbers designate numbers of horizontal surfaces below the main surface, whereas positive ordinal numbers designate numbers of horizontal surfaces above the main surface. Sample ordinal values of surfaces can be read from FIG. 6.

Figure 7A:
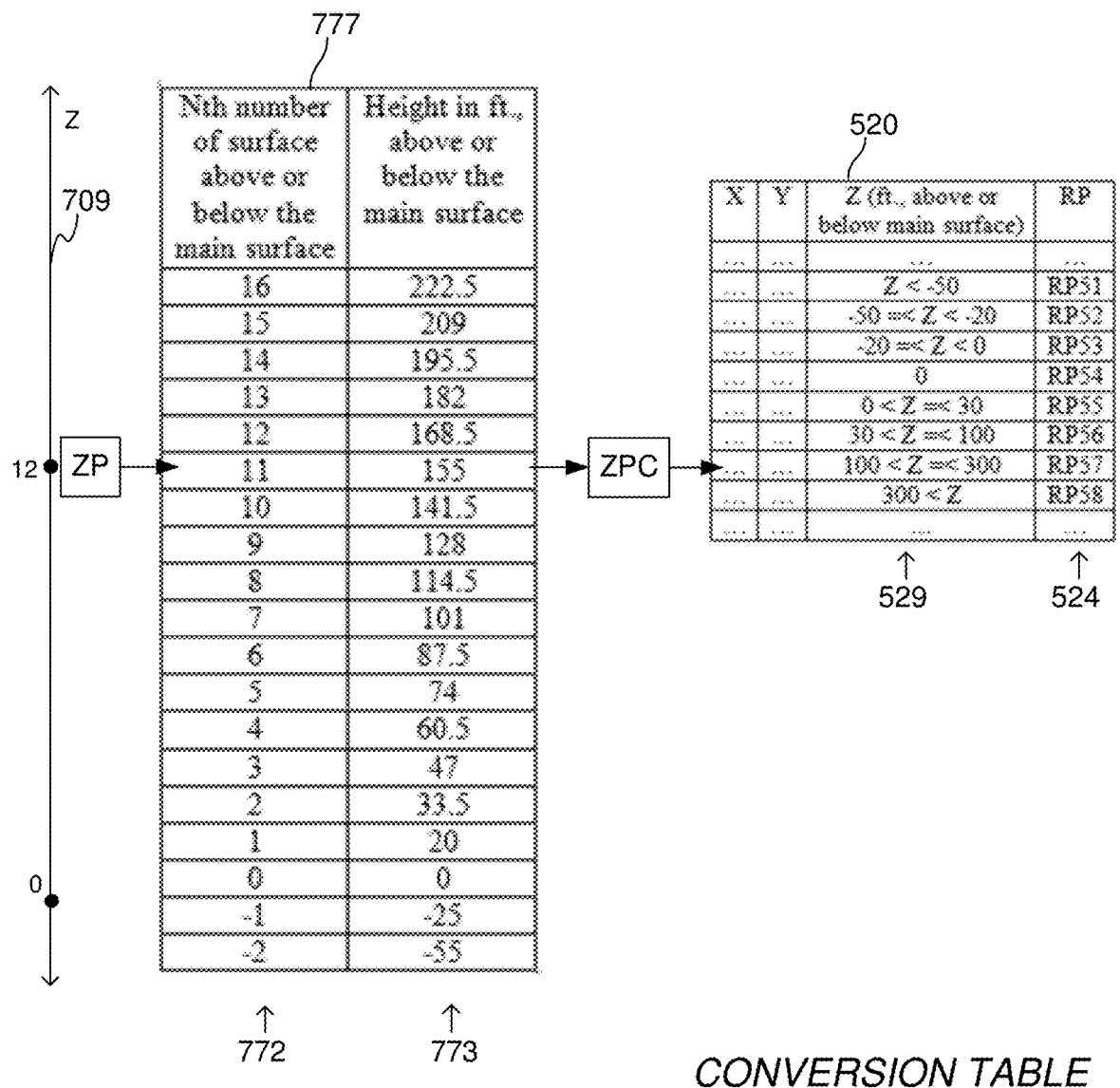
FIG. 7A illustrates a conversion table to convert a ZP coordinate value to a converted ZPC coordinate value as part of identifying a stored resource rule that applies to a place or ZP coordinate value according to embodiments.

FIG. 7A illustrates a conversion table 777 to convert a ZP coordinate value to a converted ZPC coordinate value as part of identifying a stored resource rule that applies to a place or ZP coordinate value according to embodiments. The ZP coordinate value is defined along a Z-axis 709. In this illustrative example, the ZP coordinate value is twelve (12).

The ZP coordinate value is applied to the conversion table 777 to convert the ZP coordinate value to the converted ZPC coordinate value according to embodiments. In other embodiments, other data structures besides tables may optionally be used. The conversion table 777 is arranged in columns and rows. An Nth number of surface above or below the main surface column 772 lists an Nth ordinal number of horizontal surfaces above or below a main horizontal surface. A height above or below the main surface column 773 lists distance or height (e.g., in feet (ft)) above or below the main horizontal surface. Sample values are listed in each row of the table, although these values are merely examples.

As shown by an arrow, the sample ZP coordinate value of twelve (12) indicates a row with eleven (11) surfaces above the main surface stored in the column 772. Note that the ZP coordinate value of twelve (12) may differ from the eleven (11) surfaces above the main surface because of the ways that they are defined that the main surface is or is not counted. The column 773 of the same row indicates a distance or height of 155 ft above the main surface. This distance or height of 155 ft represents the converted ZPC coordinate value for the ZP coordinate value of twelve (12).

After converting the ZP coordinate value into the converted ZPC coordinate value, the ZPC coordinate value may then be applied to a data structure such as data structure 520 that was described in FIG. 5. In this specific example, since 155 ft is greater than 100 ft and less than or equal to 300 ft, the converted ZPC coordinate value indicates resource RP57.

FIG. 7B illustrates conversion equations to convert a ZP coordinate value to a converted ZPC coordinate value as part of identifying a stored resource rule that applies to a place or ZP coordinate value according to embodiments. In this case, there are two conversion equations, namely Equation (7B-1) and Equation (7B-2), although in other cases there may be either fewer or more. These two equations take as input a value N, which is expressed in a number of surfaces above or below a main surface. In some embodiments, a ZP coordinate value may natively be expressed in the number of surfaces above or below a main surface. In other embodiments, a ZP coordinate value may first be converted to the number surfaces above or below the main surface, for example by the conversion provided by the column 772 of the conversion table 777 of FIG. 7A. Equation (7B-1) is to be used when N is greater than zero (0). The distance or height in feet above the main surface is calculated by performing Equation (7B-1), which includes multiplying N by 13.5. The distance or height in feet below the main surface is calculated by performing Equation (7B-2), which includes multiplying N by 25. These values of 13.5 and 25 are merely examples and other values may apply for other implementations. The outcome can be applied to table 520, similarly with FIG. 7A.

Figure 8:
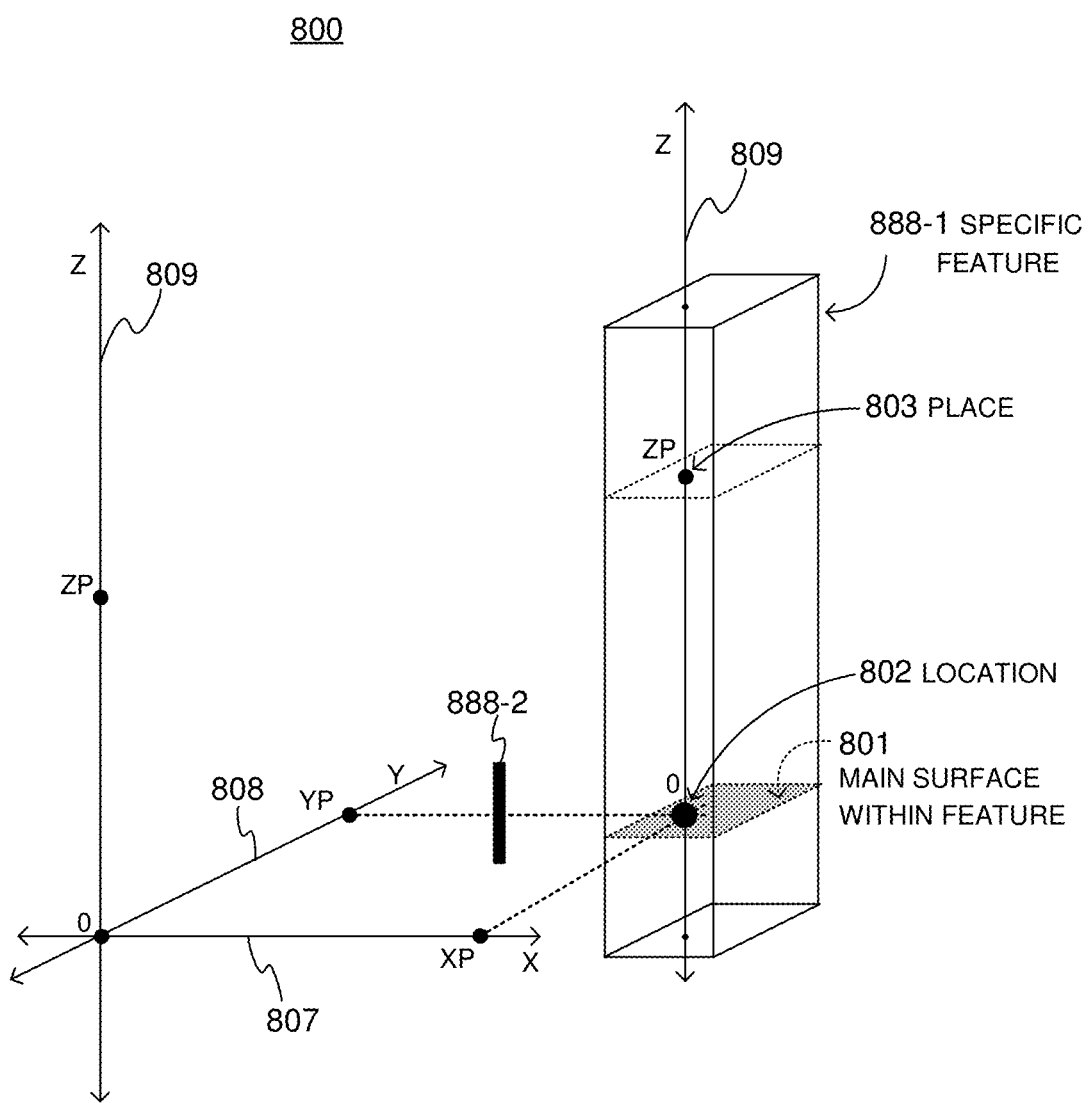
FIG. 8 is a diagram of a specific 3-dimensional feature that may be identified by a computer system for a location based on data indicating the specific 3-dimensional feature is found at that location, according to an embodiment.

FIG. 8 is a diagram of a specific 3-dimensional feature 888-1 that may be identified by a computer system for a location 802 (or XP and YP coordinate values) based on data indicating the specific 3-dimensional feature 888-1 is found at that location 802 (or XP and YP coordinate values), according to an embodiment.

A rectangular coordinate system includes an X-axis 807, a Y-axis 808, and a Z-axis 809 defined within a domain 800, similarly with what was written for domain 100. The domain 800 encompasses at least two 3-dimensional features, including the specific 3-dimensional feature 888-1, and another 3-dimensional feature 888-2.

In some embodiments, the 3-dimensional feature 888-1 may be identified by the computer system for the location 802 (or the associated XP and YP coordinate values) based on data indicating that the 3-dimensional feature 888-1 is found at that location (or the associated XP and YP coordinate values). For example, the computer system may use the location 802 (or the XP and YP coordinate values) to look up (e.g., in a computer file, database, data structure, or the like), or otherwise identify, feature data associated with the location 802 (or the XP and YP coordinate values). In some embodiments, such feature data is the existence or presence of the 3-dimensional feature 888-1 being at the location 802 (or the XP and YP coordinate values). In some such embodiments, the feature data may also include specific feature data about or descriptive of the 3-dimensional feature 888-1. A wide variety of different types of specific feature data about or descriptive of the 3-dimensional feature is possible. In general, any feature data about the 3-dimensional feature, and especially any feature data about dimensions of the 3-dimensional feature along the Z-axis 809 and/or about a vertical reference system considered parallel to the Z-axis 809 may potentially be identified. In embodiments, this may include information of or associated with a conversion table, conversion equation, or vertical reference system.

As one example, the specific feature data may include an M number labeling or arbitrary labeling scheme used for horizontal surfaces existing within the 3-dimensional feature (e.g., B2, B1, 1, 2, 3, 4, 5, 6, 7, 8, 9, 10, 11, 12, (notice 13 is not included here), 14, 15, 16, 17, 18, and so on). As another example, the specific feature data may include horizontal surfaces above or below the main surface, such as an Nth number of surface above or below the main surface (e.g., main surface 801) within the 3-dimensional feature (e.g., −2, −1, 0, 1, 2, 3, 4, 5, 6, 7, 8, 9, 10, 11, 12, 13 (notice 13 is included here), 14, 15, 16, and so on). As yet another example, the specific feature data may include a height or distance of one or more horizontal surfaces to the main surface, such as height or distance (e.g., in feet, meters, etc.) of surfaces above or below a main surface (e.g., main surface 801) within the 3-dimensional feature (e.g., −60, −40, 0, 20, 33.5, 47, 60.5, 74, and so on). As a still further example, the specific feature data may include a height or distance between two nearest adjacent surfaces within the 3-dimensional feature. One more example, would be an equation, or parameters of an equation, such as those shown in FIG. 7B.

A portion of the horizontal earthbound main surface defined by the X-axis and Y-axis is within the 3-dimensional feature 888-1 and is labeled as horizontal earthbound main surface 801. The certain location 802 is on the horizontal earthbound main surface 801 within the specific feature 888-1. The Z-axis 809 is perpendicular to the horizontal main surface 801 and extends in a vertical direction through the specific 3-dimensional feature 888-1. Different points along the Z-axis define different places within the specific 3-dimensional feature 888-1. For example, the parsed ZP coordinate value defines a certain 3-dimensional place 803 along the Z-axis 809 vertically above, below, or at the same level as, the location 802 and also within the specific 3-dimensional feature 888-1.

In some embodiments, a ZP coordinate value may be converted into a converted ZPC value in view of and/or using at least some such identified feature data about the 3-dimensional feature 888-1. As one example, this may be done using feature data associated with a conversion table, such as conversion table 777 of FIG. 7A, as previously described. As another example this may be done using feature data associated with a conversion equation, such as those of FIG. 7B, as previously described.

In the illustration, the location 802 and the place 803 are designated by small circles or dots. In some cases, location 802 and the place 803 may each be defined as a single point. The single point may represent a location that has a zero area. If location 802 and the place 803 are each a single point, they can be defined by coordinates in a certain coordinate system (e.g., the location 802 defined by XP and YP coordinate values). In other cases, the location 802 and the place 803 need not be single points, but rather may be places, and being places may have non-zero area on a surface. Moreover, while circles or dots are used in the illustration, that is merely for convenience, and it is understood that the location 802 and the place 803 need not have a circular perimeter.

Figure 9:
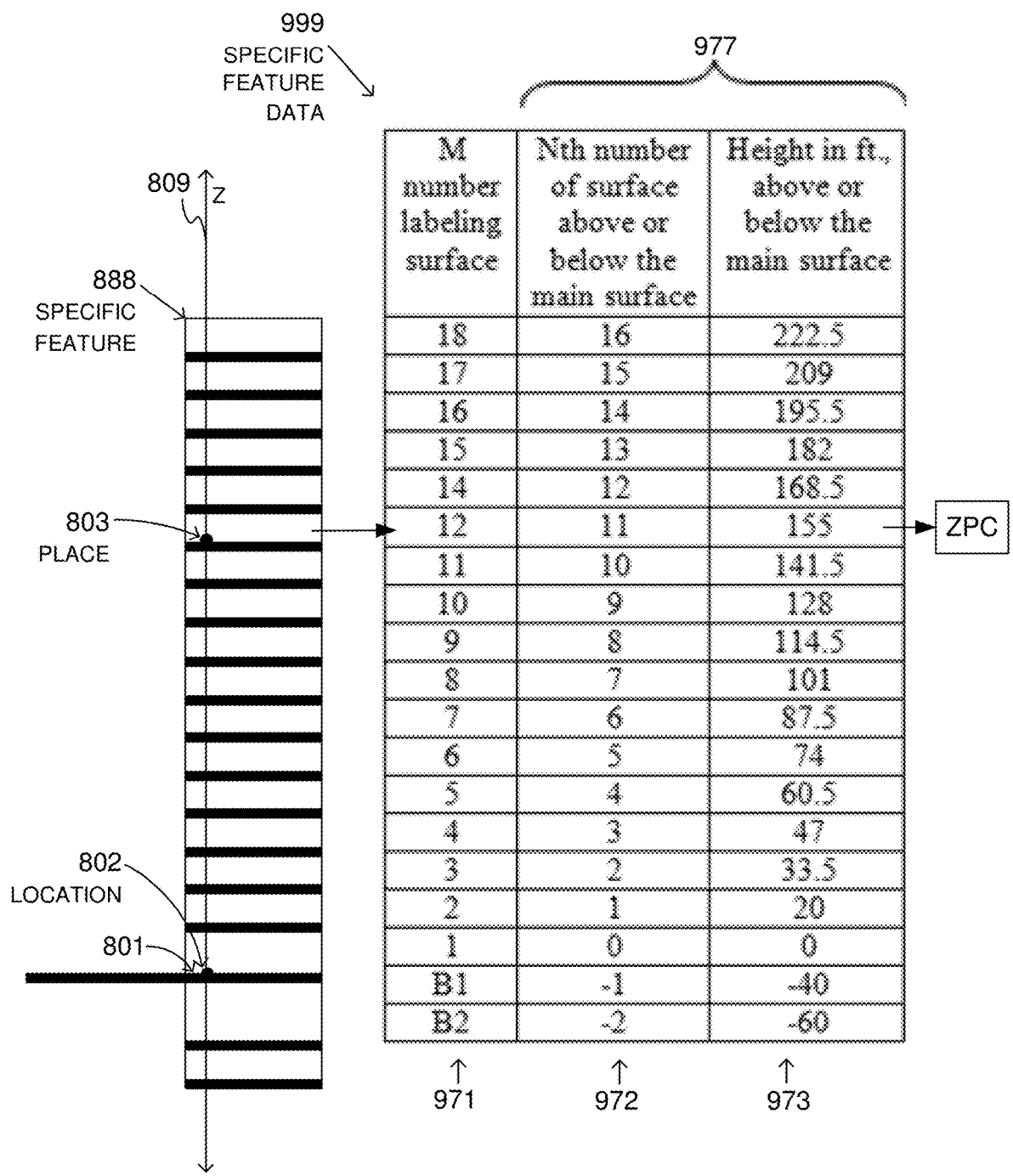
FIG. 9 shows an elevation view of the identified specific 3-dimensional feature of FIG. 8, juxtaposed alongside a table of specific feature data about the identified 3-dimensional feature that may be used to convert a place or a ZP coordinate value to a converted ZPC coordinate value, according to an embodiment.

FIG. 9 shows an elevation view, and further a more detailed view, of the specific 3-dimensional feature 888-1 that was identified as described with reference to FIG. 8. In FIG. 9, the identified specific 3-dimensional feature 888-1 is shown juxtaposed alongside a table of specific feature data 999. The table 999 is about the identified 3-dimensional feature 888-1, and may be used to convert a place 803 (or an associated ZP coordinate value) along a Z-axis 809 to a converted ZPC coordinate value, according to an embodiment. The Z-axis runs through a location 802 and main surface 801 within the specific feature 888-1. Eighteen additional horizontal surfaces above or below the horizontal earthbound main surface 801 are also shown by dark black lines.

The table 999 includes an M number labeling surface column 971 that has a row for each of the nineteen surfaces of the specific feature 888-1. Each row stores a number labeling the corresponding surface of the specific feature 888-1 (e.g., B2, B1, 1, 2, 3, 4, 5, 6, 7, 8, 9, 10, 11, 12, (notice 13 is not included here), 14, 15, 16, 17, 18). The table 999 also includes a conversion table 977 with columns 972, 973, all akin to conversion table 777 with columns 772, 773 respectively. In particular, the table 999 includes an Nth number of surface above or below the main surface column 972 and a height above or below the main surface column 973.

In this example, the place 803, which is on the eleventh layer above the main surface 801, corresponds to the row of column 971 that has the value twelve (12). Column 973 of the same row provides a value of 155 ft as the height above the main surface 801. The height of 155 ft represents a converted ZPC coordinate value for the place (or its associated ZP coordinate value).

Figure 10:
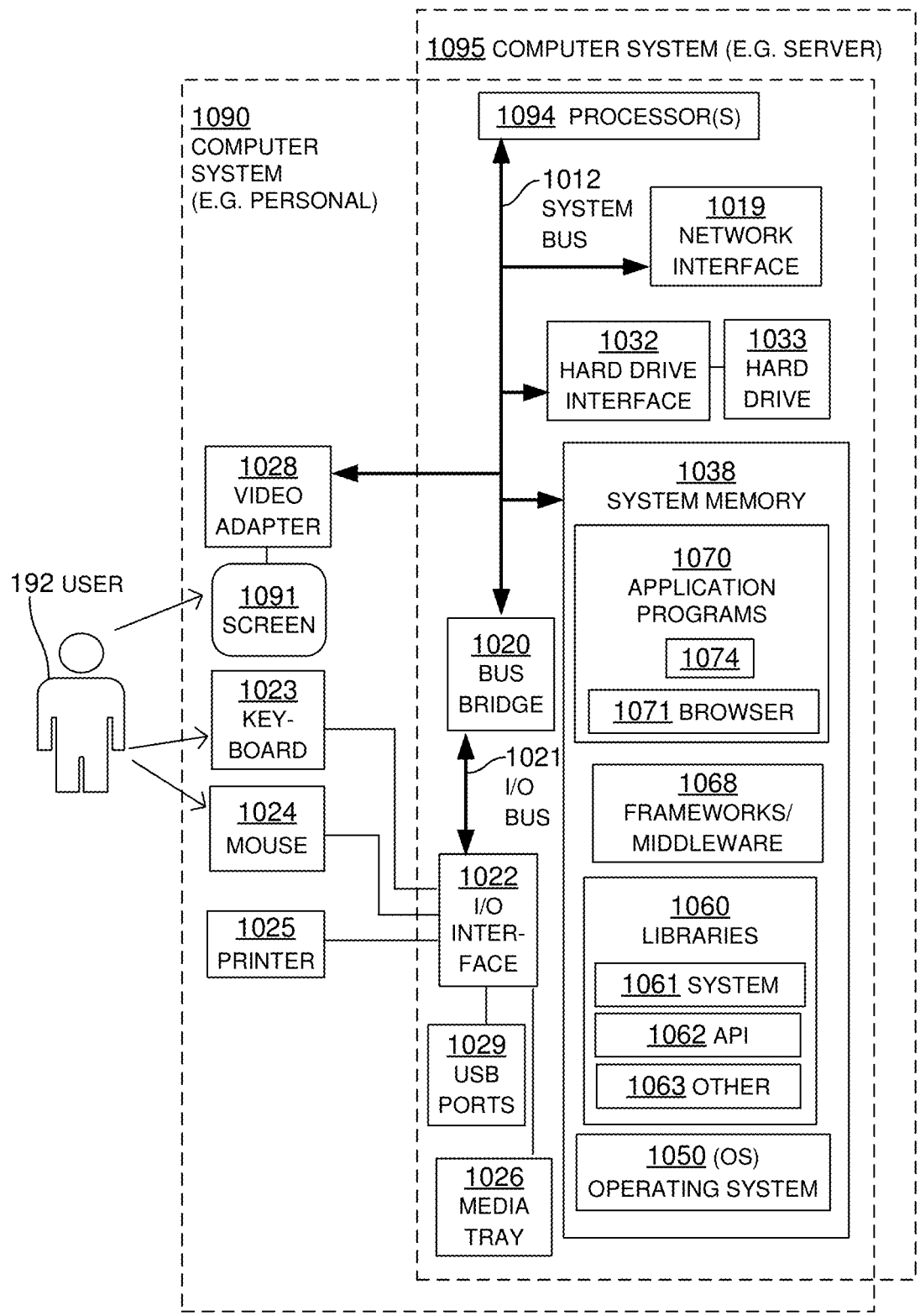
FIG. 10 is a block diagram showing additional components of sample computer systems according to embodiments.

FIG. 10 shows details for a sample computer system 1095 and for a sample computer system 1090. The computer system 1095 may be a server, while the computer system 1090 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OF 189.

The computer system 1095 and the computer system 1090 have similarities, which FIG. 10 exploits. It will be understood, however, that a component in the computer system 1095 may be implemented differently than the same component in the computer system 1090. For instance, a memory in a server may be larger than a memory in a PC, and so on. Similarly application programs 1074 that implement embodiments may be different, and so on.

The computer system 1095 includes one or more processors 1094. The processor(s) 1094 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1094 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware elements depicted in the computer system 1095, or the computer system 1090, are not intended to be exhaustive. Rather, they are representative, for highlighting essential components that can be used with embodiments.

The computer system 1095 also includes a system bus 1012 that is coupled to the processor(s) 1094. The system bus 1012 can be used by the processor(s) 1094 to control and/or communicate with other components of the computer system 1095.

The computer system 1095 additionally includes an optional network interface 1019 that is coupled to system bus 1012. Network interface 1019 can be used to access a communications network, such as the network 188. Network interface 1019 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1095 also includes various memory components. These memory components include memory components shown separately in the computer system 1095, plus cache memory within the processor(s) 1094. Accordingly, these memory components are examples of non-transitory machine-readable media. Instructions for performing any of the methods or functions described herein may be stored, completely or partially, within the memory components of the computer system 1095, etc. Therefore, one or more these non-transitory computer-readable media can be configured to store instructions which, when executed by one or more processors 1094 of a host computer system such as the computer system 1095 or the computer system 1090, cause the host computer system to perform operations according to embodiments.

The memory components shown separately in the computer system 1095 are variously coupled, directly or indirectly, with the processor(s) 1094. The coupling in this example is via the system bus 1012.

The memory components of the computer system 1095 include a non-volatile hard drive 1033. The computer system 1095 further includes a hard drive interface 1032 that is coupled to the hard drive 1033 and to the system bus 1012.

The memory components of the computer system 1095 include a system memory 1038. The system memory 1038 includes volatile memory including, but not limited to, cache memory, registers and buffers. In embodiments, data from the hard drive 1033 populates registers of the volatile memory of the system memory 1038.

In some embodiments, the system memory 1038 has a software architecture that uses a stack of layers, with each layer providing a particular functionality. In this example the layers include— starting from the bottom— an Operating System (OS) 1050, libraries 1060, frameworks/middleware 1068 and application programs 1070, which are also known as applications 1070. Other software architectures may include less, more or different layers. For example, a presentation layer may also be included. For another example, some mobile or special purpose operating systems may not provide a frameworks/middleware 1068.

The OS 1050 may manage hardware resources and provide common services. The libraries 1060 provide a common infrastructure that is used by the applications 1070 and/or other components and/or layers. The libraries 1060 provide functionality that allows other software components to perform tasks more easily fashion than to interface directly with the specific underlying functionality of the OS 1050. The libraries 1060 may include system libraries 1061, such as a C standard library. The system libraries 1061 may provide functions such as memory allocation functions, string manipulation functions, mathematical functions, and the like.

In addition, the libraries 1060 may include API libraries 1062 and other libraries 1063. The API libraries 1062 may include media libraries, such as libraries to support presentation and manipulation of various media formats such as MPREG4, H.264, MP3, AAC, AMR, JPG, and PNG. The API libraries 1062 may also include graphics libraries, for instance an OpenGL framework that may be used to render 2D and 3D in a graphic content on the screen 1091. The API libraries 1062 may further include database libraries, for instance SQLite, which may support various relational database functions. The API libraries 1062 may additionally include web libraries, for instance WebKit, which may support web browsing functionality, and also libraries for application programs 1074.

The frameworks/middleware 1068 may provide a higher-level common infrastructure that may be used by the applications 1070 and/or other software components/modules. For example, the frameworks/middleware 1068 may provide various Graphic User Interface (GUI) functions, high-level resource management, high-level location services, and so forth. The frameworks/middleware 1068 may provide a broad spectrum of other APIs that may be used by the applications 1070 and/or other software components/modules, some of which may be specific to the OS 1050 or to a platform.

The application programs 1070 are also known more simply as applications and apps. One such app is a browser 1071. The browser 1071 is an example of a renderer, which includes program modules and instructions that enable the computer system 1095, to exchange network messages with a network using Hypertext Transfer Protocol (HTTP) messaging.

The application programs 1070 may include one or more applications 1074, made according to embodiments. These can be made so as to cause their host computer to perform operations according to embodiments.

Other such applications 1070 may include a contacts application, a book reader application, a location application, a media application, a messaging application, and so on. Applications 1070 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 1070 may use built-in functions of the OS 1050, of the libraries 1060, and of the frameworks/middleware 1068 to create user interfaces for the user 192 to interact with.

The computer system 1095 moreover includes a bus bridge 1020 coupled to the system bus 1012. The computer system 1095 furthermore includes an input/output (I/O) bus 1021 coupled to the bus bridge 1020. The computer system 1095 also includes an I/O interface 1022 coupled to the I/O bus 1021.

For being accessed, the computer system 1095 also includes one or more Universal Serial Bus (USB) ports 1029. These can be coupled to the I/O interface 1022. The computer system 1095 further includes a media tray 1026, which may include storage devices such as CD-ROM drives, multi-media interfaces, and so on.

The computer system 1090 may include many components similar to those of the computer system 1095, as seen in FIG. 10. In addition, a number of the application programs may be more suitable for the computer system 1090 than for the computer system 1095.

The computer system 1090 further includes peripheral input/output (I/O) devices for being accessed by a user more routinely. As such, the computer system 1090 includes a screen 1091 and a video adapter 1028 to drive and/or support the screen 1091. The video adapter 1028 is coupled to the system bus 1012.

The computer system 1090 also includes a keyboard 1023, a mouse 1024, and a printer 1025. In this example, the keyboard 1023, the mouse 1024, and the printer 1025 are directly coupled to the I/O interface 1022. Sometimes this coupling is via the USB ports 1029.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 1094.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples— Use Cases

The above-described embodiments may be used to determine a resource based in part on a ZP coordinate value and/or a place along the Z-axis and/or a vertical dimension. There are a number of different contexts where such determination of a resource is useful. Operational examples and sample use cases are now described.

One such context is when it is desirable to determine a tax obligation or amount due by an entity, in situations where the determination of the tax obligation depends on in part on the ZP coordinate value and/or the particular place along the Z-axis and/or the vertical dimension. For example, for a single purchase by the entity, a sales tax and/or a use tax, an excise tax, and so on, may be imposed by a tax jurisdiction, such as a state, a county, a municipality, a city, and so on. This tax determination can be performed by highly specialized Software As A Service ("SaaS") providers, such as Avalara, Inc. Currently, the vertical dimension is not known to be used for tax obligation determination. As such, conventional approaches for determining tax obligation do not take into account the ZP coordinate value and/or the particular place along the Z-axis and/or the vertical dimension when determining tax obligation. However, the vertical dimension could be used for tax obligation determination, and approaches to determine tax obligation based on the ZP coordinate value and/or the particular place along the Z-axis and/or the vertical dimension would be useful in such cases.

There are various possible reasons why tax authorities may desire to vary tax amount or obligation (e.g., tax rate) with varying ZP coordinate value and/or place along the Z-axis and/or vertical dimension. The particular reason for doing this really does not matter for the embodiments disclosed herein, but to further illustrate certain concepts, a few possible reasons will be described. As one example, a municipality may want to offer lower taxes for floors below ground to encourage builders to build below ground shopping areas. As another example, they may want to impose either higher or lower taxes for higher levels of buildings to either discourage or encourage the building of higher level buildings, respectively. As yet another example, they may want to impose higher taxes for higher level floors of a residential building, since often there tends to be a correlation that on average income and/or wealth tends to increase with increasing level in the building. As a further example, they may want to impose lower taxes for mining ore, or drilling oil or water, from deeper locations, in order to encourage deeper mining or drilling. In any event, at some point there may be instances where one or more tax jurisdictions vary tax obligation with varying ZP coordinate value and/or place along the Z-axis and/or vertical dimension.

Figure 11:
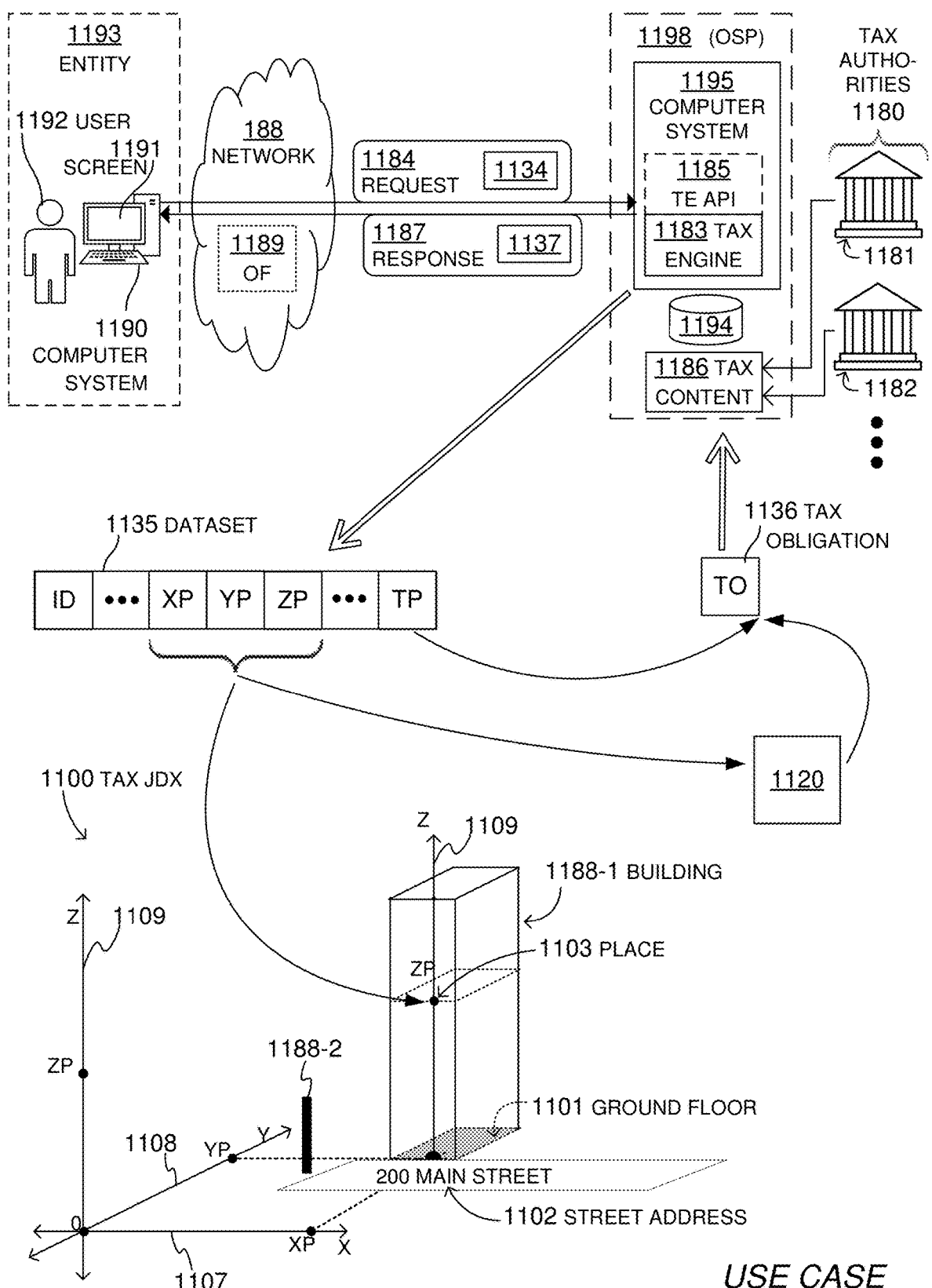
FIG. 11 presents a composite diagram for one example use case of embodiments, the composite diagram having an upper portion showing one sample environment in which a computer system associated with a vendor or other such entity communicates with a sample computer system via a communication network, such as the Internet, to have the sample computer system determine a tax obligation or amount in accordance with embodiments; and a lower portion conceptually showing a sample approach that the computer system may use to determine the tax obligation according to embodiments.

Such operational examples of embodiments are now described in more detail. FIG. 11 presents a composite diagram for one example use case of embodiments, the composite diagram having: an upper portion showing one sample environment in which a computer system 1190 associated with a vendor or other such entity 1193 communicates with a sample computer system 1195 via a communication network 188, such as the Internet, to have the sample computer system 1195 determine a tax obligation or amount (TO) 1136 in accordance with embodiments; and a lower portion conceptually showing a sample approach that the computer system 1195 may use to determine the tax obligation (TO) 1136 according to embodiments. The computer system 1195 may help customers, such as user 1192, with tax compliance. In these diagrams, arrows show salient conceptual relations between elements shown in the diagrams. In other embodiments, the determination of the tax obligation 1136 may be used in other environments besides that shown in the upper portion.

Referring first to the upper portion of FIG. 11, a user 1192 may be standalone, or optionally part of an entity 1193. Entity 1193 can be a business, a vendor of items, or a functionality used by a vendor such as a Point of Sale (POS) functionality, an Enterprise Resource Planning (ERP) functionality, or a partner of a vendor such as an Electronic Market Place (EMP), and so on.

In a number of instances, the user 1192 uses software applications to manage their business activities, such as sales, resource management, production, inventory management, delivery, billing. The user 1192 may further use accounting applications to manage purchase orders, sales invoices, payroll, accounts payable, accounts receivable, and so on. Such software applications, and more, may be used locally by the user 1192, or from an Online Facility (OF) 1189 such as an Enterprise Resource Planning (ERP) provider, e-commerce, electronic marketplace, and so on.

Businesses also have various tax obligations to various tax authorities of respective tax jurisdictions. For example, for each tax authority— such as that of a state, a city, etc. — a business that sells items may need to a) register with that tax authority's taxing agency, b) set up internal processes for collecting sales tax in accordance with the tax rules of the tax authority, c) keep records of the sales and of the collected sales tax for the event of an audit, d) periodically prepare accurately a form ("tax return") that can determine the amount of money they owe as tax, e) file the tax return with the tax authority by a deadline, and f) pay ("remit") that amount to the tax authority by a deadline.

A challenge is that the above-mentioned software applications generally cannot provide tax information that is accurate for a business to be tax compliant. The lack of accuracy may manifest as errors in the tax amount determined to be due to the various tax authorities. Such errors are not good for sellers. For example, if a seller over-estimates the tax amount due, then the seller collects more tax from the buyers than was needed. Even though the seller pays the surplus tax to the authorities, if that becomes known later then the seller risks reputational harm that they over-charged their buyers, even though accidentally. For another example, if a seller under-estimates the tax amount due, then the seller collects less tax from the buyers, and therefore pays less tax to the authorities than was due. That amounts to an underpayment of tax that will likely be discovered, if and when the tax authority later audits the seller. Then the seller will need to pay to cover the underpayment, along with paying fines. And ignorance of the law is not an excuse.

The challenge to tax compliance determinations exists because such determinations are very complex. A number of factors contribute to the complexity:

First, there are many types of taxes. Such taxes include sales tax, use tax, excise tax, value-added tax, cross-border taxes, and so on. Some types of taxes are generic for sales, while others are industry-specific. Other, new types of taxes are being created seemingly all the time.

Second, it can be hard to determine which exactly tax authorities a business has obligations to. To begin with, a business may determine which tax jurisdictions it has presence in, such as a main office. These tax jurisdictions include states, counties, cities, municipalities, special taxing jurisdictions, etc. In fact, there are over 10,000 different tax jurisdictions in the US. A selling business, however, may have additional tax obligations to tax authorities of other jurisdictions for yet other reasons. Such reasons include that more buyers reside in the other jurisdiction than a threshold, or the business has more sales in the other jurisdiction than a threshold, and so on. As such, when businesses sell or buy goods across boundaries of different tax jurisdictions, they may have obligations towards more than one tax authority. Further complexities may arise from the location of the buyer, the seller, a distributor, etc. For example, some state and local tax authorities have origin-based tax rules, which means that a sales tax is charged from the seller's location; other state and local tax authorities, however, have destination-based tax rules, which means that a sales tax is charged from the buyer's location.

Third, the different tax authorities charge different percentage rates as sales tax for the purchase and sale of items. This gives rise to millions of taxability rules related to various products and services. In addition, sometimes that rate is zero. For instance, in 2018, the sale of cowboy boots was exempt from sales tax in Texas, but not in New York.

Fourth, sometimes no sales tax is due at all. In some instances a tax jurisdiction may offer a temporary tax holiday. In other instances, certain entities are exempt from sales tax, as long as they properly create and sign an exemption certificate to that effect, and give it to the seller to maintain. Of course, who can be exempt is not the same for each tax jurisdiction. And, even when an entity is exempt, different tax jurisdictions may have different requirements for the certificate of exemption to remain valid.

To help with such complex determinations, the computer system 1195 may be a specialist in tax compliance. The computer system 1195 thus implements a tax engine 1183 to make the determinations of tax obligations. To be accessible online via network 188, the computer system 1195 also implements a TE API (Tax Engine Application Programming Interface) 1185. As such, the tax engine 1183 may be accessed remotely via the TE API 1185. Such remote accessing can be accomplished by the computer system 1190 or the OF 1189 having a connector, an extractor, and so on. The sample computer system 1195 may have one or more processors (not shown) and a memory (not shown). The memory may optionally store programs and data. The processor(s) 1194 may perform one or more of the programs, potentially utilizing some of the data, to perform operations and methods described elsewhere herein (e.g., to determine the tax obligation 1136). The computer system 1195 may optionally have additional sample implementation details described later in this document (see e.g., those shown in FIG. 10). The computer system 1195 may optionally be implemented as part of an online software platform (OSP) 1198 and/or part of a service (e.g., Software As A Service (SaaS)). Additionally, downloading may be permitted from one of these two computer systems to another, and so on. Moreover, in some embodiments, data from the computer system 1190 and/or from the computer system 1195 may optionally be stored in an online facility (OF) 1189 (e.g., which may be located someplace in the communications network 188). In such embodiments, requests and responses may be exchanged with OF 1189, downloading may involve OF 1189, and so on.

The computer system 1195 may further store locally entity data, i.e. data of user 1192 and/or of entity 1193, either of which may be the customer. The entity data may include profile data of the customer, and transaction data from which a determination of tax obligation is desired. In the online implementation of FIG. 11, the OSP 1198 has a database 1194 for storing the entity data. This entity data may be inputted by the user 1192, and/or caused to be downloaded by the user 1192 from the computer system 1190 or from the OF 1189, or extracted from the computer system 1190 or from OF 1189, and so on. In other implementations, a simpler memory configuration may suffice for storing the entity data.

A tax content 1186 is further implemented within the OSP 1198. The tax content 1186 can be a utility that stores tax data for use by the tax engine 1183. As part of managing tax content 1186, there may be continuous updates of the tax data, by inputs gleaned from a set 1180 of different tax authorities 1181, 1182, . . . . Updating may be performed by humans, or by computers, and so on. As mentioned above, the set 1180 of different tax authorities may be very large. The tax data stored in tax content 1186 may relate to boundaries of tax jurisdictions, and the different types of taxes, rules, rates, exemption requirements, etc. that the different tax authorities 1181, 1182, . . . apply, each within the boundaries of its jurisdiction.

The user 1192 may use the computer system 1190. The computer system 1190 may have a screen 1191 and optionally additional sample implementation details described in this document (e.g., those shown in FIG. 10). The computer system 1190 may access the sample computer system 1195 via the communications network 188, such as the Internet. Such accessing can be for example, by the computer system 1190 transmitting a request 1184 including a payload 1134 in a way that the request 1184 and the payload 1134 are received by the sample computer system 1195. The request 1184 has a payload 1134 that describes the particulars of a transaction, for which the tax obligation needs to be determined. In some embodiments, the request 1184 may include a request that the sample computer system 1195 determine the tax obligation 1136. The tax obligation is akin to the resource 136. In some embodiments, the payload 1134 may include at least some, or optionally all, of a dataset (e.g., dataset 1135) that is useful to determine the tax obligation 1136.

The sample computer system 1195 may receive the request 1184 and the payload 1134. In some embodiments, at least some or optionally all the dataset (e.g., dataset 1135) useful to determine the tax obligation 1136 may be received from the computer system 1190 or entity 1193 via the network 188 (e.g., as part of the payload 1134). In some cases, at least some of the dataset may be received in other ways, such as loading data form memory, downloading data from the online facility (OF) 1189, or the like. The sample computer system 1195 may parse the dataset (e.g., dataset 1135) to determine values that allow it to determine the tax obligation 1136. The sample computer system 1195 may determine the tax obligation 1136 based on these values.

In some embodiments, the sample computer system 1195 may then cause the tax obligation RS 1136 to be communicated or transmitted to another device via the network 188. For example, the TE 1183 may cause the TE API 1185 to initiate transmission of the response 1187 that communicates the tax obligation 1136 to one or more recipients across the network 188. The computer system 1195 may transmit the response 1187 in a way that the response 1187 is caused to be received by the computer system 1190, or to OF 1189, or to both. In some of these embodiments, the tax obligation 1136 may be included in a payload 1137 of the response 1187. The tax obligation 1136 may encode the desired answer, which can be tax information, such as a sales tax amount due, exemption requirements, and so on. In some embodiments, the tax obligation 1136 may optionally be communicated along with at least some of the dataset (e.g., one or more values of the dataset 1135) to help the recipient correlate the response 1187 to the request 1184 and/or the tax obligation 1136 as the response to the dataset (e.g., dataset 1135). For example, the received dataset (e.g. dataset 1135) may optionally be augmented with the computed tax obligation 1136, and then the dataset augmented with the determined tax obligation 1136 may be caused to be transmitted to the computer system 1190, or to OF 1189, or to both, via the network 188. As another example, an identifier associated with the entity 1193 may be appended to, or otherwise included along with, the tax amount or obligation 1136, and then transmitted to recipient(s) via the network 188.

Referring now to the lower portion of FIG. 11, which conceptually shows further details of a sample approach that the computer system 1195 may use to determine the tax obligation 1136 according to embodiments, will now be further described in greater detail. The dataset 1135 is one example of a dataset that the computer system 1195 may receive. The dataset 1135 may have several fields to provide several respective parameter values. For example, the sample dataset 1135 has an identity field (ID) to provide an identity value associated with the dataset 1135 itself, and/or an identity of the user 1192 or the entity 1193, and so on. What was described previously for the dataset 135 may apply also to the dataset 1135. In some embodiments, the dataset 1135 may optionally have a transaction price (TP) field (TP), for example in U.S. dollars or other local currency, to provide a transaction price purportedly performed in connection with the place. Such could be the attribute value of the dataset 135, and so on.

The computer system 1195 may then parse coordinate values from the dataset (e.g., parse the XP, YP, and ZP coordinate values for the dataset 1135. The XP, YP, and ZP coordinate values may be defined along an X-axis 1107, a Y-axis 1108, and a Z-axis 1109, respectively, which can be similar to the axes 107, 108, 109. The X-axis 1107, the Y-axis 1108, and the Z-axis 1109 may be defined within at least one domain, which in this case is at least one tax jurisdiction (JDX) 1100 (e.g., city, county, state, etc.). The tax jurisdiction 1100 or other domain may encompass at least two 3-dimensional features, such as a first building 1188-1 and a second building 1188-2, and optionally others. The first building 1188-1 and the second building 1188-2 are of course made from at least some solid materials, and have non-zero mass. The X-axis 1107 and the Y-axis 1108 may be perpendicular to one other, and may define a horizontal earthbound ground floor 1101 labeled as ground floor 1101 within the tax jurisdiction (JDX) 1100. The XP coordinate value and the YP coordinate value together define a certain location, which in this example may be a street address 1102 ("200 Main Street"). The street address may be one used to deliver mail by the country's Postal Service. That same Postal Service may also define a location by other means. For example, the US Postal Service already has defined zip codes. In other embodiments, the location or street address may be identified in other ways, such as a longitude and latitude based geographic coordinate system. Such a system may have an axis that points East-West, which can indicate geographic longitude, and an axis that points North-South, which can indicate geographic latitude. These axes intersect at a point that is transferable to various locations. The geographic coordinate system (latitude, longitude) is, strictly speaking, a type of spherical coordinates. When taken locally, however, it can be thought of as a type of rectangular coordinates, given that the radius of the earth is so much larger than the distances involved. As another alternate embodiment, the dataset 1135 may potentially specify a street address specifically, including a Z-dimensional attribute (e.g., a floor number, suite number (e.g., Suite 1600 indicative of the 16th floor), or the like that allows determination of the ZP coordinate value). For convenience, the street address 1102 is designated by a small circle or dot, although it may be a place, and being a place may have a non-zero area.

In some embodiments, the computer system may identify a specific 3-dimensional feature known to be at the location or street address (e.g., by accessing predetermined or pre-existing stored data about the location and identifying the 3-dimensional feature). In some embodiments, the specific 3-dimensional feature may be the building 1188-1 known to be at the street address or even a floor or other 3-dimensional feature within the building. By way of example, the building may represent a commercial building, a shopping mall, a manufacturing facility, an apartment complex, a house, or other type of building where a tax obligation determination may be needed. Depending on the building, there may be zero or more floors above the earthbound ground floor 1101 and zero or more floors below the earthbound ground floor 1101.

The ZP coordinate value may be defined along the Z-axis 1109 that is perpendicular to, and that extends in a vertical direction above and below, the ground floor 1101. Different coordinate values along the Z-axis 1109 therefore represent different vertical distances and different places above or below the ground floor 1101. The XP, YP and ZP coordinate values together define a place 1103 in 3-dimensions within the tax jurisdiction (JDX) 1100. The building 1188-1 may be associated with the place 1103. In embodiments, the place may be an earthbound place that can be occupied by a human standing upright. In this example, the place 1103 is one of the floors above the ground floor 1101 within the building 1188-1. Such a place (or the associated coordinate values) may be used to determine the tax amount or obligation 1136. In some embodiments, the computer system may optionally look up or otherwise identify specific feature data about the building or the place 1103. One example of such feature data is a distance of a floor (e.g., the floor having the place 1103) from a reference point (e.g., the ground floor 1101). Another example of such feature data is an equation or parameter of an equation that may be used to calculate a distance of a floor (e.g., the floor having the place 1103) from a reference point (e.g., the ground floor 1101). In some embodiments, the ZP coordinate value corresponding to the place may optionally be converted to a converted ZPC coordinate value based on and/or in view of such identified feature data (e.g., by using a conversion table or a conversion equation).

The computer system may then access tax obligation rules 1120 that are stored in one or more data structures. The tax obligation rules may apply for determining the tax obligation with respect to place in the tax jurisdiction 1100. The tax obligation rules 1120 may include different rules that apply for different ZP coordinate values (e.g., different heights, vertical dimensions, etc.) at the street address 1102 indicated by the XP and YP coordinate values. The stored tax obligation rules may indicate a first resource (e.g., a first value for the tax obligation 1136) if the ZP coordinate value has a first number value, and a second resource different from the first resource (e.g., a second value different than the first value for the tax obligation 1136) if the ZP coordinate value has a second number value different from the first number value.

The computer system may then identify a certain one of a set of the accessed tax obligation rules 1120 that applies to the place 1103 based on the parsed coordinate values (e.g., the XP, YP, and ZP coordinate values).

As shown by arrows, the computer system 1195 may determine the tax obligation 1136 for the dataset 135 (e.g., the XP, YP, and ZP coordinate values) by applying the identified certain tax obligation rule. In some embodiments, determining the tax obligation 1136 may include merely looking up or identifying a predetermined value for the tax obligation 1136 for the identified rule. In other embodiments, determining the tax obligation 1136 may include calculating the tax obligation 1136 in a way indicated by the identified rule (e.g., based on an equation and/or data for that particular rule). In any event, the identified tax obligation rule may specify or modulate how the tax obligation 1136 is to be determined based at least on varying values of the ZP coordinate value. As one specific example, the tax obligation may be 7%. In some embodiments, the computer system 1195 may also parse one or more other values related to the certain place from the dataset 1135. As one example, the computer system may parse a transaction price from the transaction price field (TP). The computer system may also determine the tax amount or obligation by being computed based on the such values. For example, the tax obligation may be the determined tax rate (e.g., 7%) multiplied by the transaction price (i.e., TP×7%). Other values may also optionally be included in and/or parsed from the dataset 1135, such as data of a buyer, a seller, an item, and so on. Possible examples are a transaction id number (ID), the buyer name (BAN), the buyer address (BAL), the seller name (SAN), the seller address (SAL), item information (ITM), a date of order, a currency designation for the sales price, id number for any permit, and so on.

The computer system may then cause the determined tax obligation 1136 to be transmitted to another device via the network 188 in response to the received dataset 1135. For example, the computer system 1195 may transmit the response 1187 in a way that the response 1187 is caused to be received by the computer system 1190, or to OF 1189, or to both. In some of these embodiments, the tax obligation 1136 may be included in the payload 1137 of the response 1187. In some embodiments, the determined tax obligation 1136 may optionally be transmitted or communicated along with at least some of the received dataset 1135 (e.g., an identity value), or optionally the entire received dataset 1135. One reason to do this is to include information with the tax obligation 1136 to help a recipient of the tax obligation 1136 (e.g., a customer, merchant, or other form of the entity 1193) correlate the received tax obligation 1136 with the request 1184, the dataset 1135, or the XP, YP, and ZP coordinate values used to determine the tax obligation 1136.

The above example is based on the building 1188-1, but other embodiments are not limited to merely buildings. Rather, other embodiments may determine tax obligation based on ZP coordinate values or vertical dimension in other environments. One example is for airspace above developed or undeveloped land, such as to determine tax obligation associated with commercial drones, other aircraft, and so on. Another example is for depth below the ocean or undeveloped land, such as for determination of tax obligation for mining, drilling, and so on. The specific environmental details of where the vertical dimension is found are not particular limiting to the broader concepts.

Figure 12:
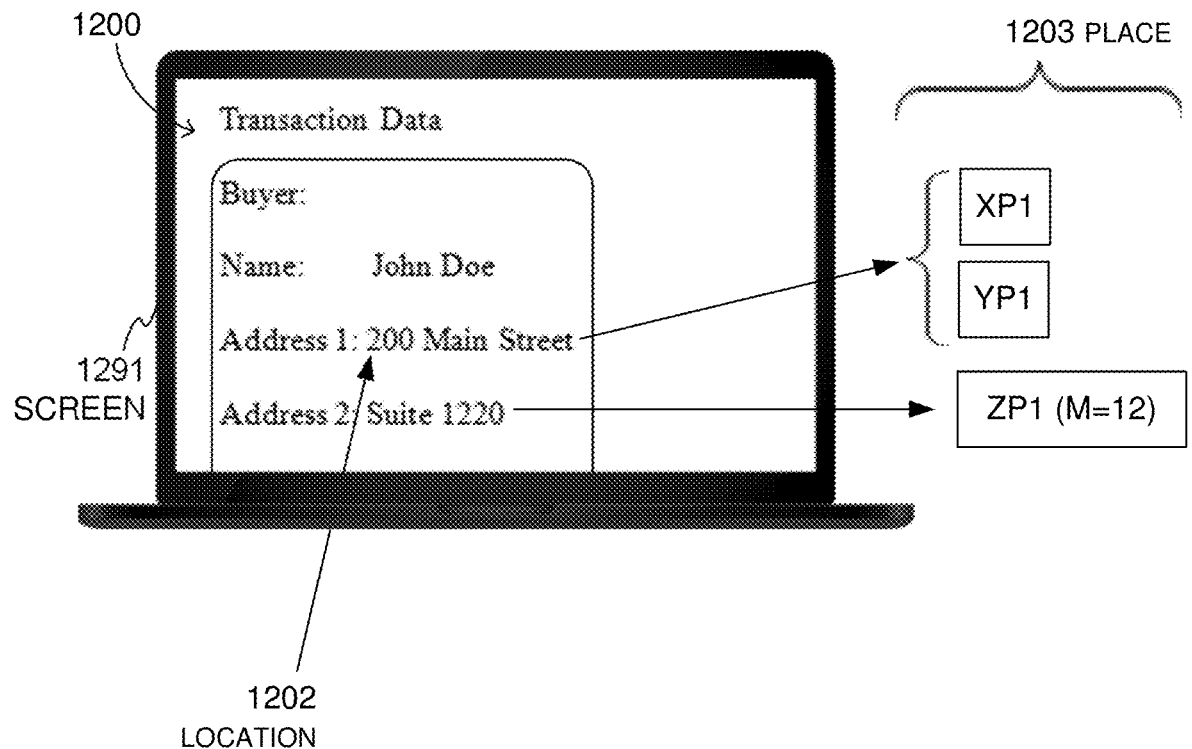
FIG. 12 shows an operational example or use case in which a User Interface shows sample data of a transaction that is used to determine a place for purposes of a tax amount or other tax obligation determination for the transaction, according to one embodiment.

FIG. 12 shows an operational example or use case showing sample data 1200 of a transaction. The data 1200 is used to determine a place 1203 for purposes of tax amount or obligation determination according to one embodiment. The data 1200 is presented via a User Interface (UI) on a screen 1291. The data 1200 includes data of a transaction where the buyer is named John Doe. The data 1200 also includes first address information indicative of a street address or other ground floor location 1202 of an associated building (e.g., 200 Main Street) of the buyer. As shown by an upper substantially horizontal arrow, the first address information or location 1202 may be used to determine an XP1 and YP1 coordinate values. The sample transaction data 1200 also includes second address information indicative of a floor or other vertical place 1203 at that street address or other location (e.g., Suite 1220). As shown by a lower horizontal arrow, the second address information (e.g., Suite 1220) may be used to determine a ZP1 coordinate values, or M number labeling for the floor or surface (e.g., M=12 for Suite 1220 which is on the twelfth floor). The determined XP1, YP1, AND ZP1 coordinate values may be included in a dataset (e.g., dataset 1135), which the associated computer system (e.g., computer system 1190) may transmit to another computer system (e.g., computer system 1195) via a network (e.g., network 188).

Figure 13:
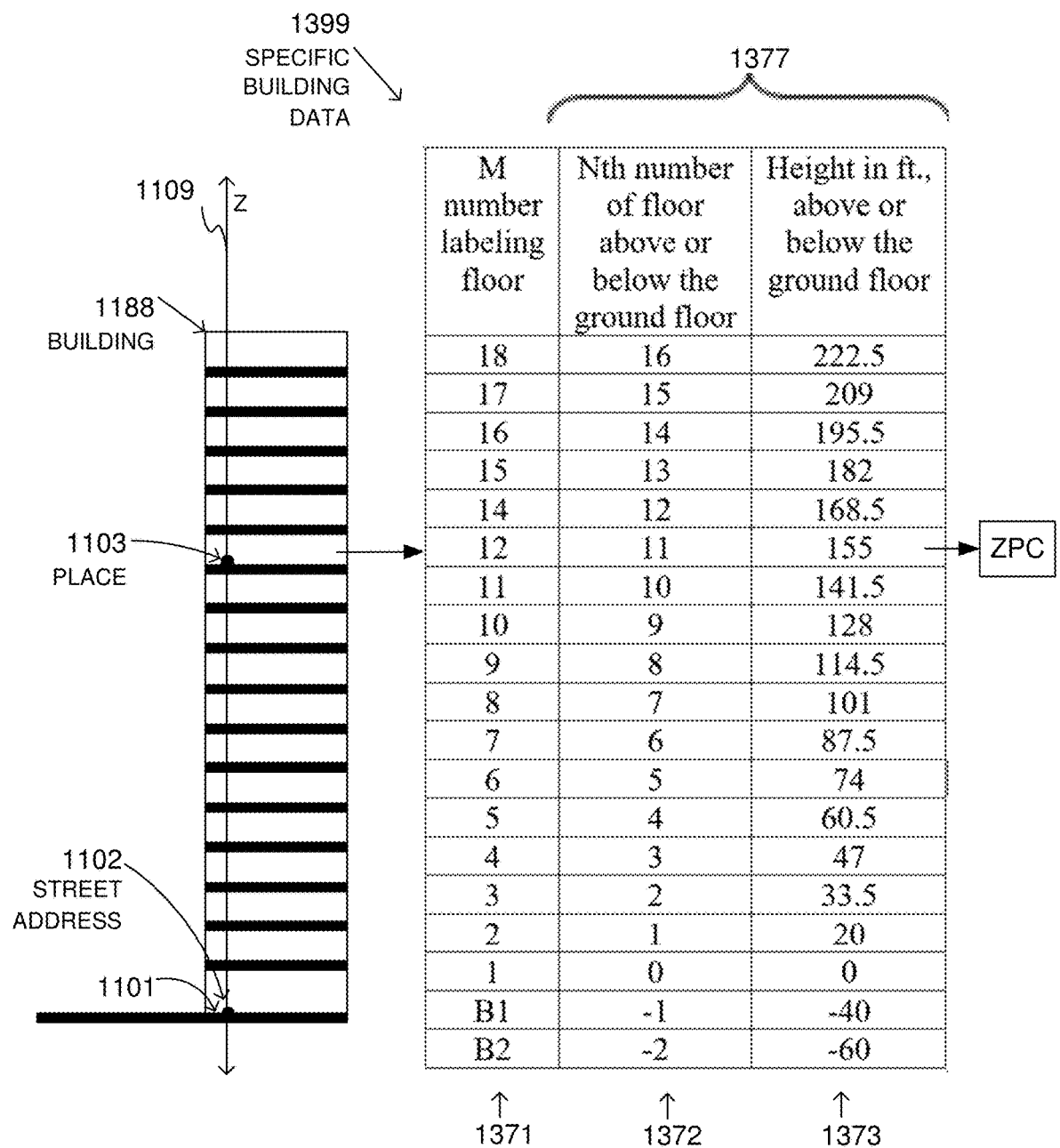
FIG. 13 shows an elevation view of the building of FIG. 11, juxtaposed alongside a table of specific building data about the building that may be used to convert a place or ZP coordinate value to a converted ZPC coordinate value, according to an embodiment.

FIG. 13 shows an elevation view of the building 1188-1 of FIG. 11. Here the building 1188-1 is shown juxtaposed alongside a table of specific building data 1399 about the building 1188-1 that may be used to convert a place 1103 (or that places associated ZP coordinate value) along a Z-axis 1109 to a converted ZPC coordinate value, according to an embodiment. The Z-axis runs through a horizontal earthbound ground floor 1101 of the building at a street address 1302. In this example, the building has nineteen floors as indicated in the building data 1399. In the elevation view of the building 1188-1, the ground floor 1101 is shown as are sixteen floors above the ground floor 1101 (shown by short thick lines). The building also has two floors below the ground floor 1101 (e.g., basement levels) corresponding to B1 and B2 in the data 1399. These floors simply are not shown in the elevation view of the building.

The table includes an M number labeling floor column 1371 that has a row for each of the nineteen floors of the building 1188-1. Each row stores a number labeling the corresponding floor of the building 1188-1 (e.g., B2, B1, 1, 2, 3, 4, 5, 6, 7, 8, 9, 10, 11, 12, (notice 13 is not included here), 14, 15, 16, 17, 18). The table also includes an Nth number of floor above or below the main floor (ground floor 1101) column 1372. The table also includes a height above or below the main floor (ground floor 1101) column 1373. As shown in column 1373, the ground floor may be defined as zero height, with positive distances used for floors above the ground floor, and negative distances for floors below the ground floor (e.g., B1 and B2 basement levels). These may represent a conversion table 1377 which may be similar to the conversion table 977 previously described for FIG. 9. Although most of the specific values in this example are the same as those of other tables herein, this is merely for convenience, and entirely different values may instead apply for different buildings with different numbers of floors and dimensions.

In this example, the place 1103 is on the eleventh floor above the ground floor 1101. The place 1103 corresponds to the row of column 1371 that has the value twelve (12). Column 1372 of the same row provides a value of 11 indicating that it is the eleventh floor above the ground floor 1101. This difference is because in column 1371 the ground floor 1101 by convention is considered to have a value of 1, whereas in column 1372 a zero is indicated because the ground floor 1101 is the ground floor 1101 not a floor above the ground floor 1101. Column 1373 of the same row provides a value of 155 ft as the height above the ground floor 1101. Providing such specific building data allows accurate height determination in cases where the floor-to-floor distance varies from one building to another. The height of 155 ft represents a converted ZPC coordinate value for the place 1103 (or its associated ZP coordinate value). In other embodiments, instead of the conversion table 1377, the conversion may optionally be performed by conversion equation(s). In some cases, the converted ZPC coordinate value may then be applied to a vertical reference system as described elsewhere herein.

Notice also that column 1371 uses an M number labeling of 14 instead of 13 for the thirteenth floor above the ground floor 1101. By convention, some buildings (not all) omit using the M number of 13 for the thirteenth floor and instead use 14. The feature data may thus indicate whether or not there is a discontinuity in the M number labeling of floors (e.g., jumping from 12 to 14 skipping 13). In one embodiment, a 13th floor indicator or parameter may optionally be used (e.g., included in a dataset (e.g., dataset 1135), included as part of the specific building data 1399, or both) to indicate whether a 13th floor of a building has an M number labeling of 13 (the indicator or parameter has a first value) or 14 (the indicator or parameter has a second value different than the first value). Thus, determination of tax obligation may in some embodiments take into account discontinuities in numbers labeling floors or other surfaces.

Other Use Cases:

The embodiments described herein area also applicable to other technologies. For example, the embodiments described herein may be used for vertically modulated measurement of weather or environmental pollution data with drones. Other embodiments, may be used for vertically modulated control of laser intensity or duration for 3-dimensional laser printing where material properties vary at least in the vertical direction and possibly also in one or more horizontal directions due to gradients, laminates, or the like.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A method for a computer system, the method including at least:

receiving, by the computer system, a dataset;

parsing, by the computer system and from the dataset, an XP coordinate value that is defined along an x-axis, a YP coordinate value that is defined along a y-axis, and a ZP coordinate value that is defined along a z-axis, the x-axis the y-axis and the z-axis being defined within a domain that encompasses at least two 3-dimensional features, the x-axis and the y-axis being perpendicular to each other and defining a horizontal earthbound main surface within the domain, the ZP coordinate value defined along the z-axis that is perpendicular to the horizontal earthbound main surface, the parsed XP, YP and ZP coordinate values thus defining a certain place within the domain, a specific 3-dimensional feature of the at least two 3-dimensional features being associated with the certain place, the 3-dimensional features having non-zero mass;

accessing, by the computer system, stored resource rules for places in the domain, the stored resource rules indicating a first resource if the ZP coordinate value has a first number value and a second resource different from the first resource if the ZP coordinate value has a second number value different from the first number value;

identifying, by the computer system and based on the parsed XP, YP and ZP coordinate values, a certain one of the accessed resource rules that applies to the certain place;

determining, by the computer system applying the identified certain resource rule, a resource for the dataset; and causing, by the computer system, the determined resource to be transmitted in response to the received dataset.

2. The method of claim 1, in which:

the dataset is received from a computer system of an entity via a network, and the determined resource is caused to be transmitted to the computer system of the entity via the network.

3. The method of claim 1, further including:
parsing, by the computer system and from the dataset, an attribute value related to the certain place, and
in which the resource is determined by being computed from the attribute value.

4. The method of claim 1, in which:
the received dataset is further augmented by the determined resource, and
the determined resource is caused to be transmitted by causing the dataset augmented by the determined resource to be transmitted.

5. The method of claim 1, in which:
the first resource and the second resource are indicated according to a vertical reference system considered parallel to the z-axis, and
the identifying includes applying the ZP coordinate value to the vertical reference system.

6. The method of claim 5, in which:
the vertical reference system is defined in terms of height above or below the horizontal earthbound main surface, and
the ZP coordinate value indicates a height above or below the horizontal earthbound main surface.

7. The method of claim 5, in which:
the vertical reference system is defined in terms of ordinal numbers of horizontal surfaces above or below the horizontal earthbound main surface, and
the ZP coordinate value indicates an Nth horizontal surface above or below the horizontal earthbound main surface.

8. The method of claim 5, further including:
converting, by the computer system, the parsed ZP coordinate value into a converted ZPC value before applying it to the vertical reference system.

9. The method of claim 8, in which:
the converting is performed by a conversion table.

10. The method of claim 8, in which:
the converting is performed by one or more conversion equations.

11. The method of claim 8, in which:
the XP and YP coordinate values define a location, and
the method further includes: identifying, by the computer system and from the location, the specific 3-dimensional feature known to be at the location; and
looking up, by the computer system, specific feature data about the identified specific 3-dimensional feature, and
in which the converting is performed in view of the specific feature data.

12. The method of claim 11, in which:
the location is defined as one of a point and a place.

13. The method of claim 11, in which:
the x-axis and the y-axis are part of one of rectangular coordinates and spherical coordinates.

14. The method of claim 11, in which:
the specific 3-dimensional feature includes horizontal surfaces above or below the horizontal earthbound main surface, and
the feature data indicates a distance of one of the horizontal surfaces to the horizontal earthbound main surface.

* * * * *